US010110723B2

(12) United States Patent
Minezawa et al.

(10) Patent No.: US 10,110,723 B2
(45) Date of Patent: Oct. 23, 2018

(54) CONTROLLER, UNIT CONTROL SYSTEM, UNIT CONTROL METHOD, AND NON-TRANSITORY COMPUTER-READABLE RECORDING MEDIUM

(71) Applicant: Mitsubishi Electric Corporation, Tokyo (JP)

(72) Inventors: Satoshi Minezawa, Tokyo (JP); Hirotoshi Yano, Tokyo (JP); Masaaki Yabe, Tokyo (JP); Yuki Ogawa, Tokyo (JP); Ichiro Maruyama, Tokyo (JP); Shinji Nakamura, Tokyo (JP); Shiro Suzuki, Tokyo (JP); Masayuki Komatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 155 days.

(21) Appl. No.: 14/785,866

(22) PCT Filed: Apr. 25, 2014

(86) PCT No.: PCT/JP2014/061723
§ 371 (c)(1),
(2) Date: Oct. 21, 2015

(87) PCT Pub. No.: WO2014/175433
PCT Pub. Date: Oct. 30, 2014

(65) Prior Publication Data
US 2016/0182704 A1 Jun. 23, 2016

(30) Foreign Application Priority Data

Apr. 26, 2013 (JP) ................................. 2013-093521

(51) Int. Cl.
*H04M 1/725* (2006.01)
*G08C 17/02* (2006.01)
(Continued)

(52) U.S. Cl.
CPC ........ *H04M 1/72533* (2013.01); *G08C 17/02* (2013.01); *H04L 12/2818* (2013.01);
(Continued)

(58) Field of Classification Search
CPC ....... H04W 12/06; H04W 8/245; H04W 4/12; H04Q 9/00
(Continued)

(56) References Cited

U.S. PATENT DOCUMENTS 7,702,421 B2 * 4/2010 Sullivan ............... F24F 11/0009
236/51
2008/0263124 A1 * 10/2008 Song .................... H04L 12/2803
709/201
(Continued)

FOREIGN PATENT DOCUMENTS

JP   2003-106651 A   4/2003
JP   2004-056466 A   2/2004
(Continued)

OTHER PUBLICATIONS

International Search Report of the International Searching Authority dated Jul. 8, 2014 for the corresponding international application No. PCT/JP2014/061723 (and English translation).
(Continued)

*Primary Examiner* — Sam Bhattacharya
(74) *Attorney, Agent, or Firm* — Posz Law Group, PLC

(57) ABSTRACT

A controller in an energy management system is configured to acquire environmental parameters indicating an environment within a home. The controller is configured to receive a request from a terminal device installed outside the home for remotely operating a unit installed in the home such as an air-conditioning system. The controller is configured to transmit to the terminal device query data containing the acquired environmental parameters, and a query on whether
(Continued)

to control the unit according to the request, when receiving the request. The controller is configured to control the unit based on a response to the query from the terminal device.

19 Claims, 16 Drawing Sheets

(51) Int. Cl.
 *H04L 12/28* (2006.01)
 *H04M 11/00* (2006.01)
 *H04Q 9/00* (2006.01)
(52) U.S. Cl.
 CPC ............ *H04M 11/007* (2013.01); *H04Q 9/00* (2013.01); *G08C 2201/51* (2013.01)
(58) Field of Classification Search
 USPC .......................... 455/415, 418–420; 348/734
 See application file for complete search history.

(56) References Cited

U.S. PATENT DOCUMENTS

| | | | |
|---|---|---|---|
| 2011/0270732 A1* | 11/2011 | Ritter | G06Q 40/04 705/37 |
| 2012/0286924 A1 | 11/2012 | Goto | |
| 2014/0098247 A1* | 4/2014 | Rao | H04W 4/20 348/207.1 |
| 2016/0182704 A1 | 6/2016 | Minezawa et al. | |

FOREIGN PATENT DOCUMENTS

| | | |
|---|---|---|
| JP | 2004-112507 A | 4/2004 |
| JP | 2004-129280 A | 4/2004 |
| JP | 2004-180260 A | 6/2004 |
| JP | 2004-310476 A | 11/2004 |
| JP | 2005-184711 A | 7/2005 |
| JP | 2005-311967 A | 11/2005 |
| JP | 2006-287639 A | 10/2006 |
| JP | 2006-331138 A | 12/2006 |
| JP | 2008-042262 A | 2/2008 |
| JP | 2011-250027 A | 12/2011 |
| JP | 2012-253756 A | 12/2012 |
| JP | 2014-216884 A | 11/2014 |

OTHER PUBLICATIONS

Office Action dated Dec. 17, 2013 issued in corresponding JP patent application No. 2013-093521 (and partial English translation).
Office Action dated Apr. 21, 2015 issued in corresponding JP patent application No. 2014-120052 (and partial English translation).
Office Action dated Mar. 14, 2017 issued in corresponding JP patent application No. 2016-088437 (and partial English translation).
Office Action dated Feb. 8, 2018 issued in corresponding CN patent application No. 201480023066.0 (and English translation).
Office Action dated Aug. 7, 2018 issued in corresponding JP divisional patent application No. 2017-160534 (and English translation).

* cited by examiner

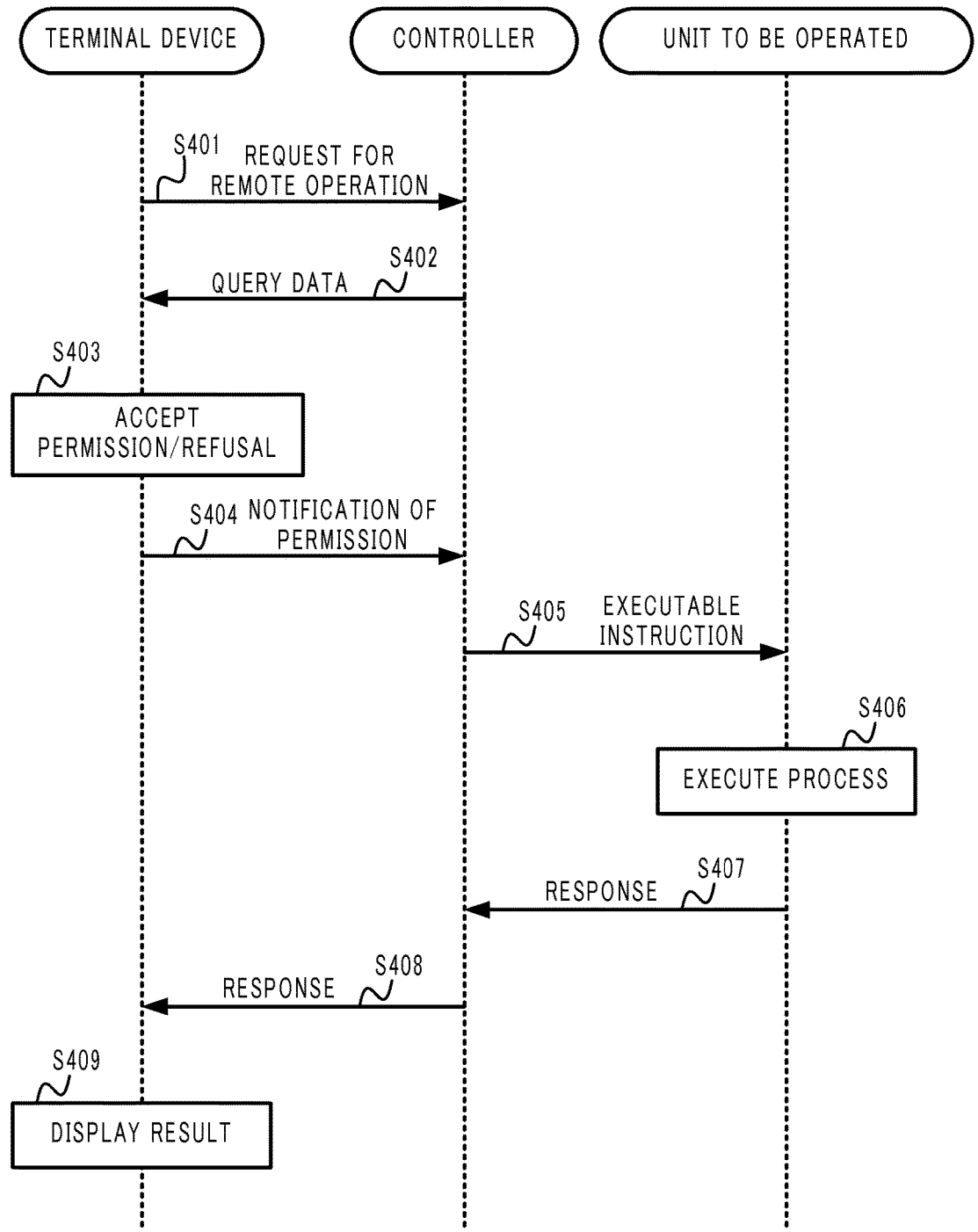

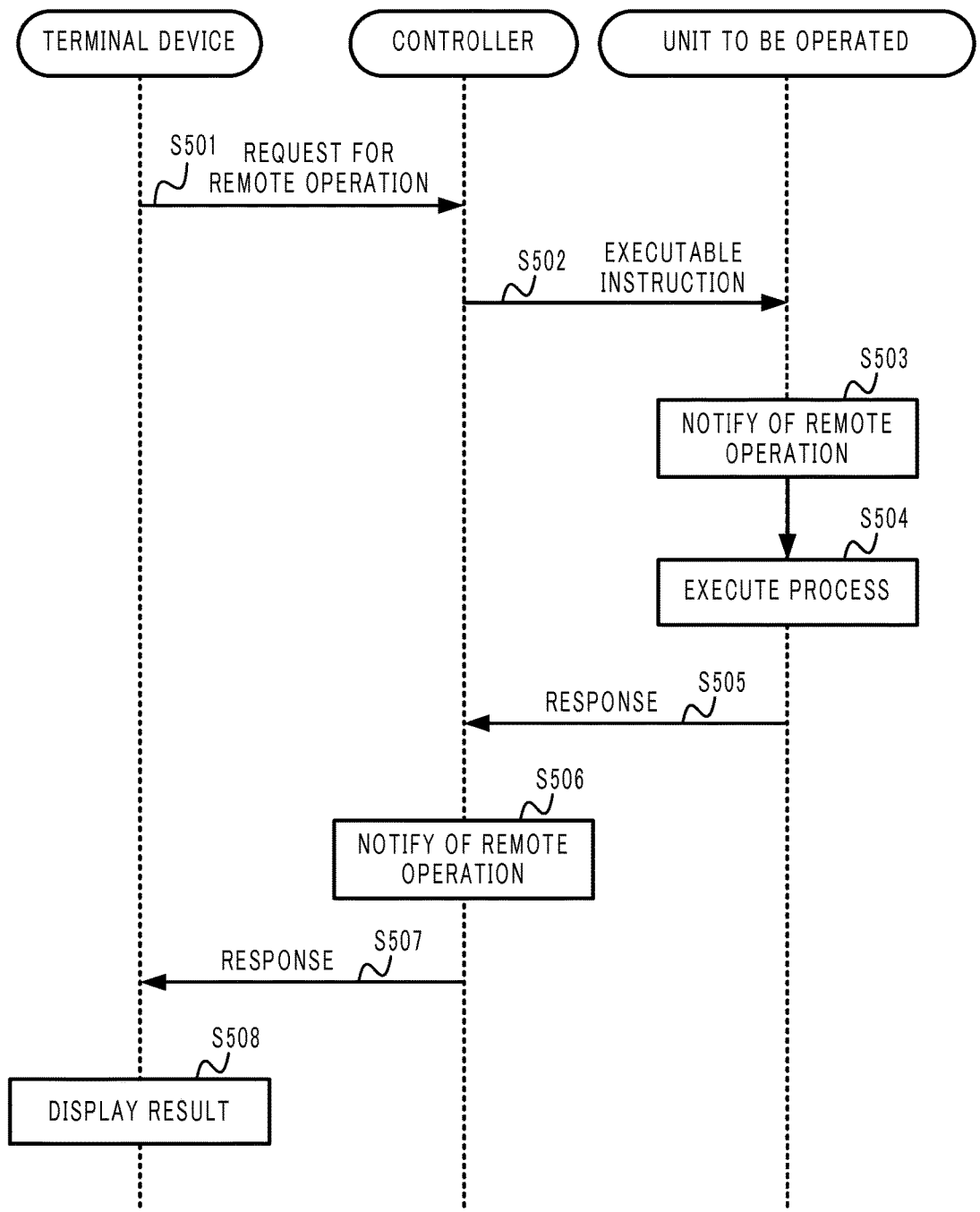

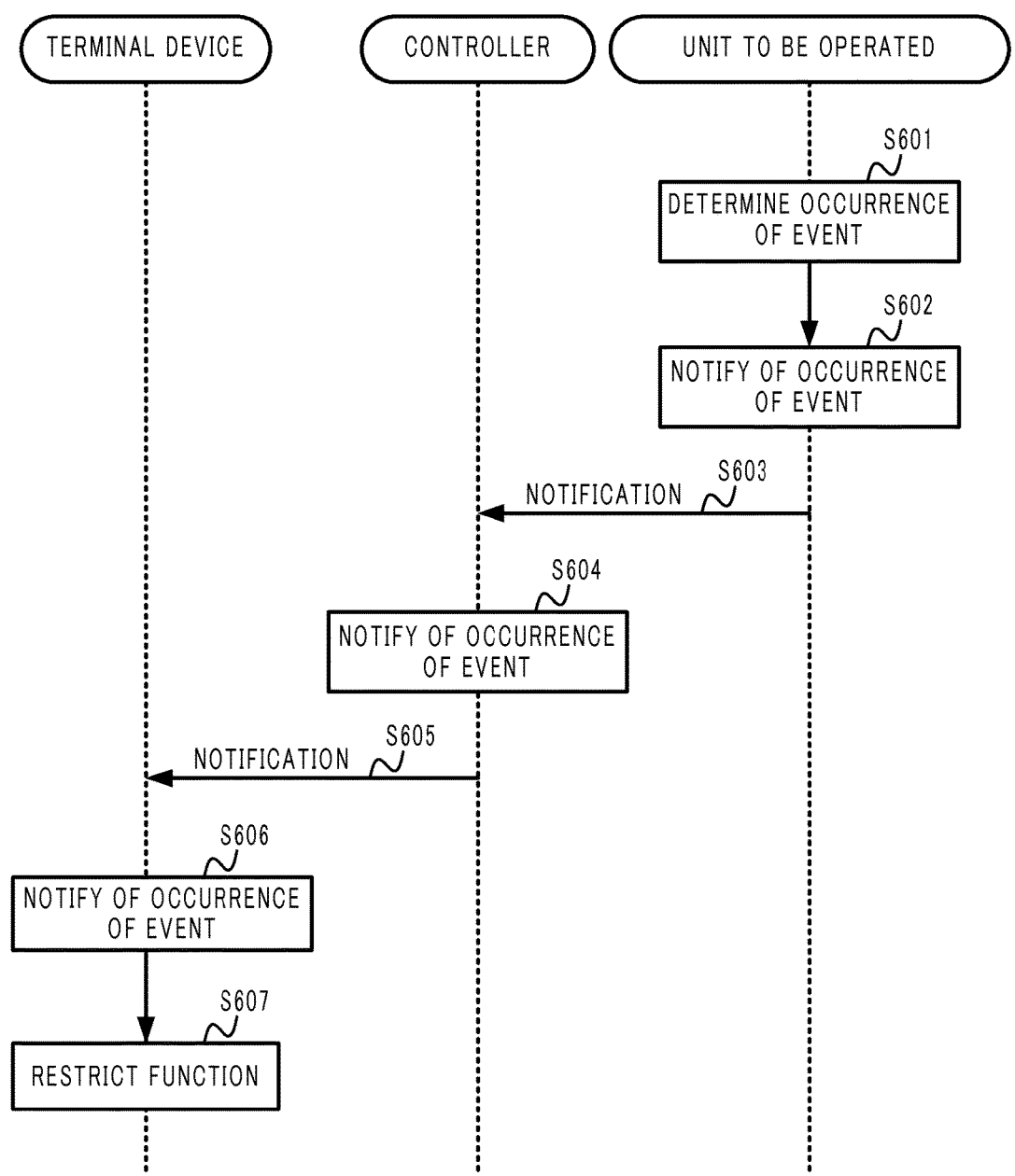

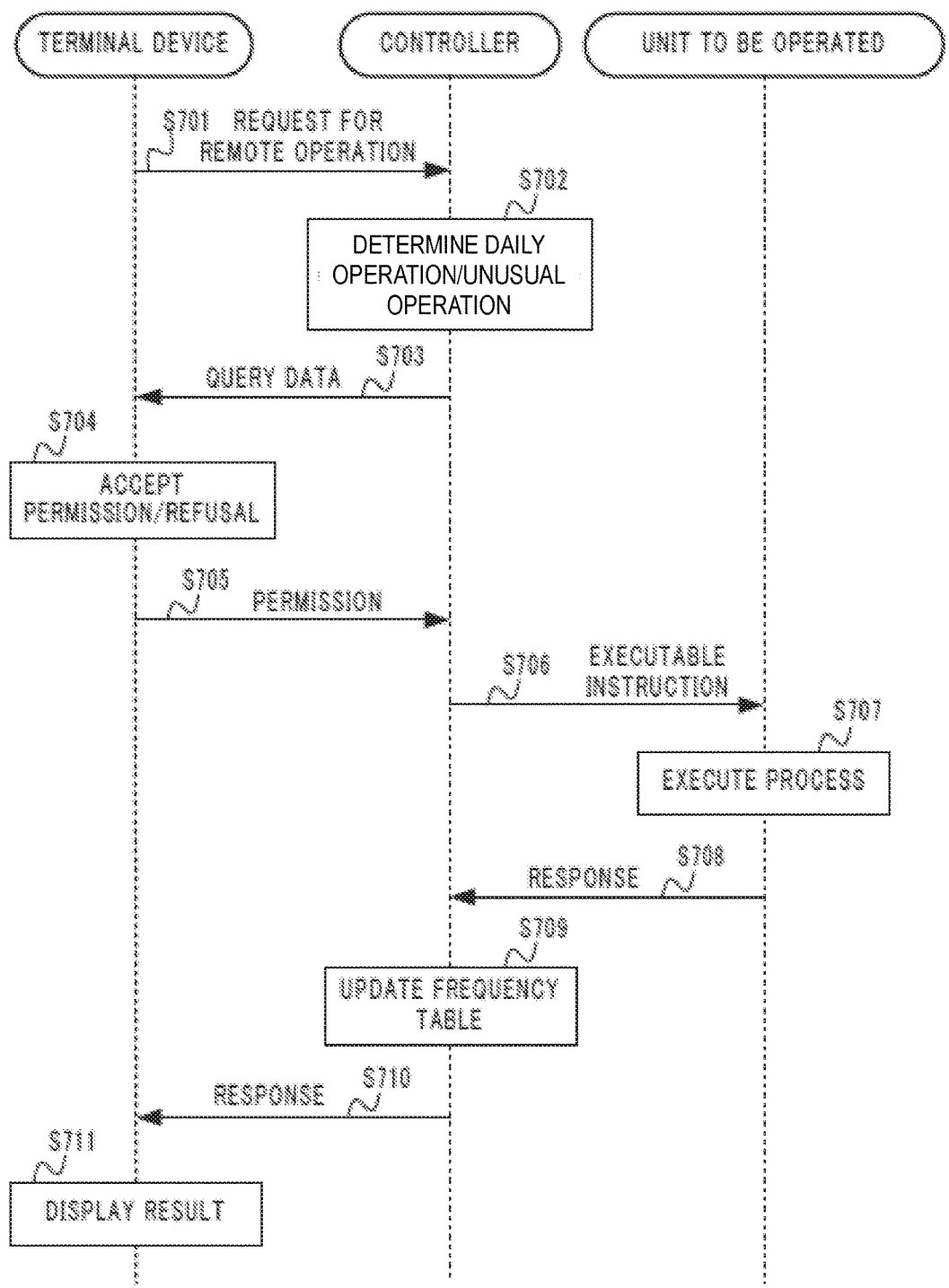

| SENDER | COMMAND | RECEPTION TIME |
|---|---|---|
| ABC | POWER ON | 2013/4/26 12:05:25 |
| ABC | ACQUIRE OPERATING MODE | 2013/4/26 12:07:30 |
| ABC | DECREASE SET TEMPERATURE BY 2°C | 2013/4/26 12:09:12 |
| ... | ... | ... |
| XYZ | ACQUIRE OPERATING MODE | 2013/4/26 15:31:48 |
| ... | ... | ... |

| SENDER | COMMAND TYPE | NUMBER OF RECEPTIONS | SORTING RESULT |
|---|---|---|---|
| ABC | POWER ON | 20 | UNUSUAL OPERATION |
| ABC | POWER OFF | 50 | DAILY OPERATION |
| ABC | CHANGE SET TEMPERATURE | 3 | UNUSUAL OPERATION |
| ... | ... | ... | ... |
| XYZ | POWER ON | 37 | DAILY OPERATION |
| XYZ | POWER OFF | 2 | UNUSUAL OPERATION |
| XYZ | CHANGE SET TEMPERATURE | 45 | DAILY OPERATION |
| ... | ... | ... | ... |

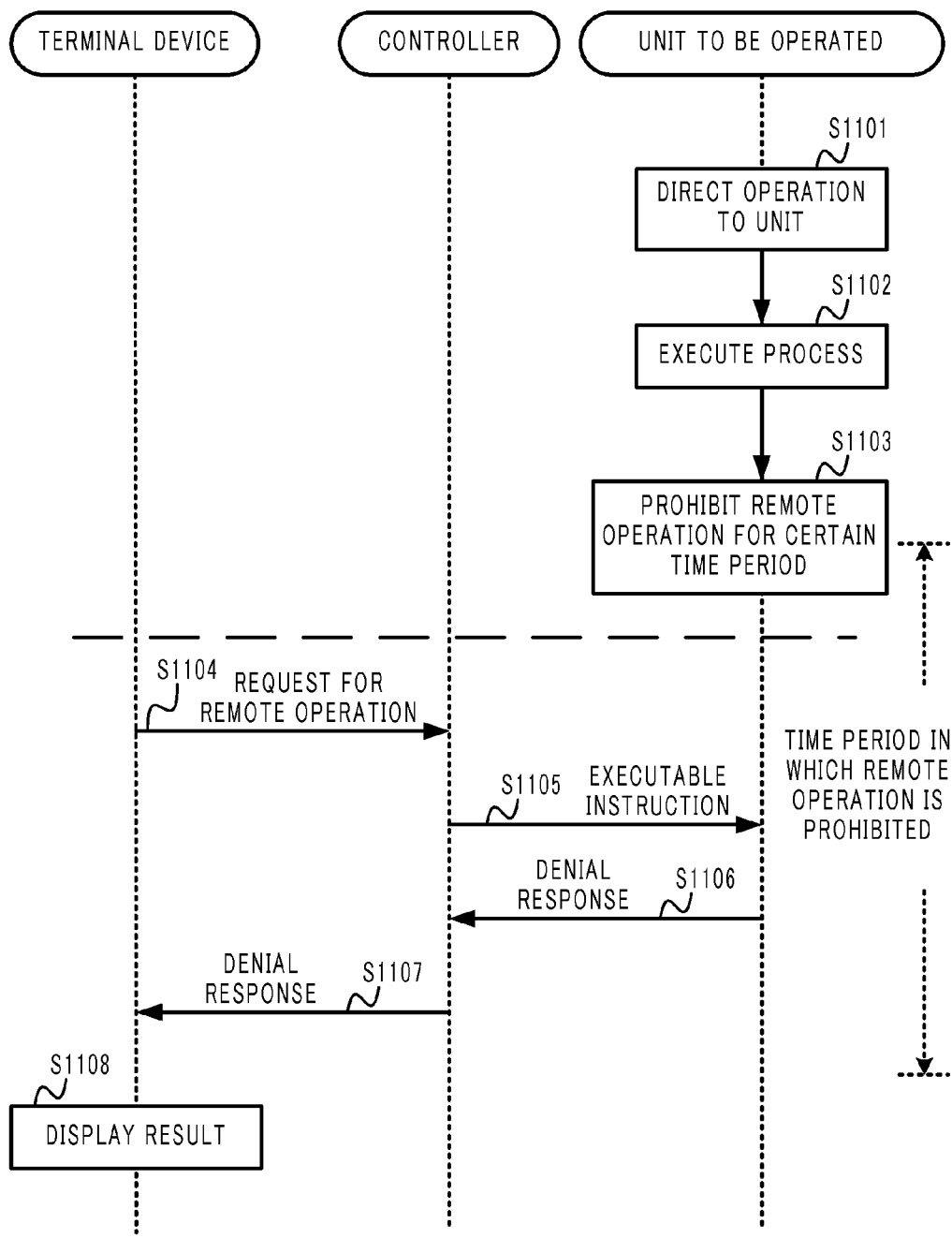

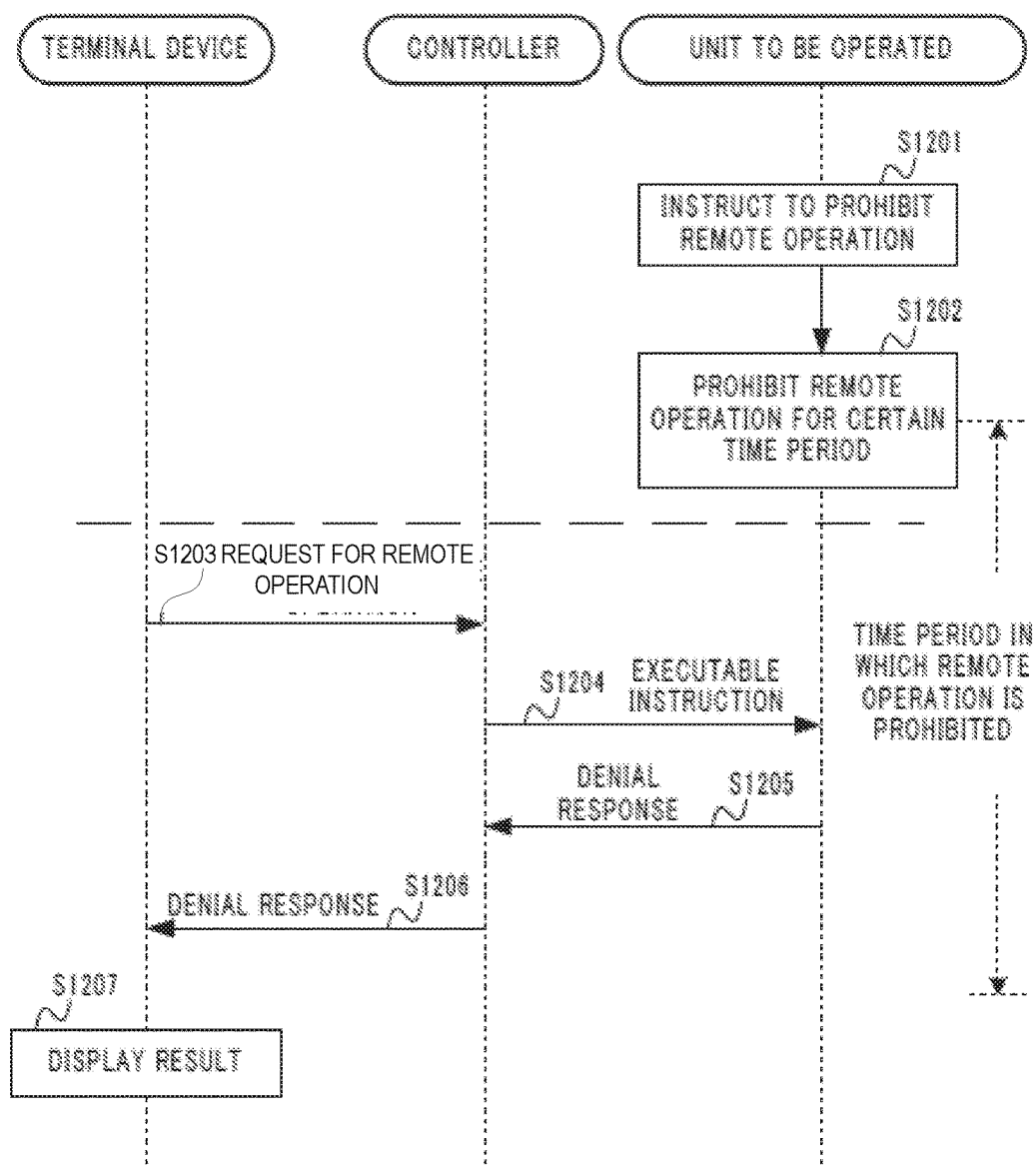

CONTROLLER, UNIT CONTROL SYSTEM, UNIT CONTROL METHOD, AND NON-TRANSITORY COMPUTER-READABLE RECORDING MEDIUM

CROSS REFERENCE TO RELATED APPLICATION

This application is a U.S. national stage of International Patent Application No. PCT/JP2014/061723 filed on Apr. 25, 2014, which claims priority to Japanese Patent Application No. 2013-093521 filed on Apr. 26, 2013, the contents of which are incorporated herein by reference.

TECHNICAL FIELD

The present disclosure relates to a controller, an energy management system, a remote control method, and a program which enhance the safety of a remote control of units installed in a home.

BACKGROUND ART

A system is known that is called a HEMS (Home Energy Management System) which connects electrical units installed in a home to a communication network, and which integrally manages the units by a controller. In recent years, as disclosed in, for example, Patent Literature 1, a HEMS is also known which can remotely operate units installed in a home via, for example, the Internet from outside of the home even if a user is not home. According to Patent Literature 1, the units can be remotely controlled, and the system makes a query to the user requesting an approval prior to the execution of the remote operation, and, when the approval is given, the system executes the remote operation.

CITATION LIST

Patent Literature

Patent Literature 1: Unexamined Japanese Patent Application Kokai Publication No. 2005-311967

SUMMARY OF INVENTION

Technical Problem

According to Patent Literature 1, however, it is difficult for the user to know beforehand the conditions within the home such as the status of the units at the time of a remote operation, and thus the units are sometimes operated unexpectedly based on an offhand operation by the user. Hence, as for the remote operation, a proposal of technologies are desired that assure higher safety.

The present disclosure has been made in view of the aforementioned circumstances, and it is an objective to further enhance the safety of a remote control of units installed in a home.

Solution to Problem

To accomplish the objective above, a controller according to the present disclosure includes:

an acquirer configured to acquire environmental parameters indicating an environment within a home;

a receiver configured to receive a request from a terminal device outside the home for remotely operating a unit installed in the home;

a transmitter configured to transmit to the terminal device query data containing the environmental parameters acquired by the acquirer, and a query on whether to control the unit according to the request, when the receiver receives a request from the terminal device; and a unit controller configured to control the unit based on a response to the query from the terminal device.

Advantageous Effects of Invention

It is possible to further enhance the safety of a remote control of units installed in a home.

BRIEF DESCRIPTION OF DRAWINGS

FIG. 4 is a diagram illustrating a flow of a unit controlling process according to a first embodiment;

FIG. 5 is a diagram illustrating a flow of a unit controlling process according to a second embodiment;

FIG. 6 is a diagram illustrating a flow of a unit controlling process according to a third embodiment;

FIG. 7 is a diagram illustrating a flow of a unit controlling process according to a fourth embodiment;

FIG. 8 is a diagram illustrating a structure of an operation history table;

FIG. 9 is a diagram illustrating a frequency table;

FIG. 11 is a diagram illustrating a flow of a unit controlling process according to a sixth embodiment;

FIG. 12 is a diagram illustrating a flow of a unit controlling process according to a seventh embodiment;

DESCRIPTION OF EMBODIMENTS

First Embodiment

Figure 1:
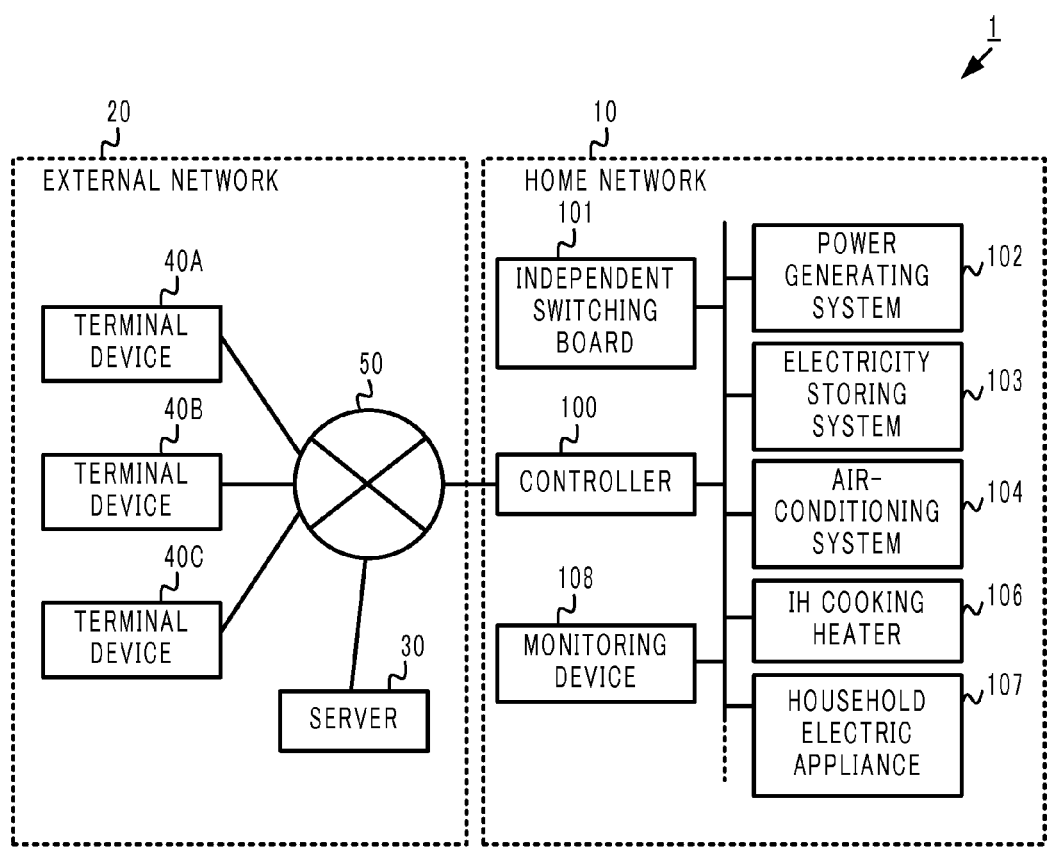
FIG. 1 is a diagram illustrating a structure of an energy management system.

FIG. 1 illustrates a structure of an energy management system 1 according to this embodiment. The energy management system 1 monitors the power consumption, the status, and the like of various units installed in a home (a power consumer), and controls the operation of the various units.

A home network 10 includes a controller 100, an independent switching board 101, a power generating system 102, an electricity storing system 103, an air-conditioning system 104, an IH (Induction Heating) cooking heater 106, and other house hold electric appliances 107, a monitoring device 108, and the like.

An external network 20 includes terminal devices 40 (three terminal devices 40A, 40B, and 40C in FIG. 1) used by a user to operate the air-conditioning system 104 and the like within the home from outside of the home, a server 30, and a communication network 50. A typical communication network 50 is the Internet. The number of terminal devices 40 may be one, or may be a multiple number as illustrated in FIG. 1.

The independent switching board 101, the power generating system 102, the electricity storing system 103, the air-conditioning system 104, the IH cooking heater 106, the household electric appliances 107, the monitoring device 108, and the controller 100 are all connected with a home power line (unillustrated). The home power line is also connected with a commercial power source from an electricity company via the independent switching board 101. Each of such the units or the systems receives power supplied from at least one of the commercial power source, the power generating system 102, and the electricity storing system 103.

In addition, each of the aforementioned units or systems includes an unillustrated wireless communication device, and can wirelessly communicate with the controller 100. However, some of or all of the communications within the home may be performed via a cable.

Power measuring devices (unillustrated) are installed at multiple locations in the home power line and sequentially detect, for example, electric energy consumed at the power generating system 102, the electricity storing system 103, the air-conditioning system 104, the IH cooking heater 106, and the household electric appliance 107. The measurement result is transmitted to the controller 100.

The operating mode of the energy management system 1 can generally be divided into two operating modes. The first mode is an interconnection mode in which the home power line is connected with the commercial power source via the independent switching board 101, and power is supplied from the commercial power source. In the interconnection mode, power generated by the power generating system 102 can be supplied to the commercial power source, that is, can be sold to the electricity company and the like.

The second mode is an independent operating mode in which the home power line is disconnected to the commercial power source by the independent switching board 101, and power generated by the power generating system 102, and/or electric energy stored in the electricity storing system 103 is supplied to the home without a power supply from the commercial power source.

The operating mode is switched by the independent switching board 101 based on the detection result that is detected by the independent switching board 101 and indicates the power supply status from the commercial power source. Typically, the interconnection mode is set except in the case of a blackout of the commercial power source, and when the blackout of the commercial power source is detected, the mode is switched to the independent operating mode.

The power generating system 102 performs solar power generation with solar panels, and stores the generated power in the electricity storing system 103. Power generated by the power generating system 102 is supplied to the units and the like within the home network 10, or is sold to the electricity company and the like.

The electricity storing system 103 stores electric energy generated by the power generating system 102, and electric energy from the commercial power source.

The IH cooking heater 106 is an electromagnetic cooker that heats a cooking container such as a pan by induction heating.

The household electric appliances 107 is home units other than the air-conditioning system 104 and the IH cooking heater 106, and includes, for example, a rice cooker, a microwave oven, a television receiver, and a lighting device and the like.

The monitoring device 108 includes sensors that measure the temperature, the humidity, the brightness, the presence/absence of the user and the like within the home. In addition, the monitoring device 108 may include a camera that captures an image of the interior and/or the exterior of the home. Each of the measured temperature, humidity, brightness, presence/absence of the user, and the like by the sensors, and the images captured by the camera is one of the environmental parameters indicating an environment within the home.

In addition, the operating status of the unit to be controlled by the controller 100, the communication status of the home network 10, and the communication status of the external network 20 may be utilized as the environmental parameters.

In this embodiment, the user is capable of controlling within the home the air-conditioning system 104 and the like installed in the home, and remotely controlling such the units via the communication network 50 from outside of the home even if the user is not home.

More specifically, the user operates the terminal device 40 to connect the terminal device 40 to the communication network 50. The terminal device 40 is connected to the server 30 on the communication network 50. The terminal device 40 transmits commands for the air-conditioning system 104 and the like to the server 30. The server 30 transmits the received command to the controller 100 via the communication network 50. Next, the controller 100 transmits the control signals to the air-conditioning system 104 and the like to be controlled according to the received command Consequently, a remote operation of the units is realized.

In this embodiment, the terminal device 40 is a tablet type information terminal. However, the terminal device 40 may be a mobile phone, a multi-function mobile phone (that is, a so-called smart phone), or a personal computer. The user installs, in the terminal device 40 beforehand, a software application (hereinafter, referred to as an "application") which controls the air-conditioning system 104 and the like within the home network 10, and which monitors the status of the air-conditioning system 104. The user touches a software button on the screen displayed by the application for example, thereby remotely controlling the air-conditioning system 104 and the like.

For example, the user can start the application of the terminal device 40, and input an instruction of activating the deactivated air-conditioning system 104 to start cooling. This instruction is transmitted to the server 30 via the communication network 50, and is further transmitted to the controller 100 from the server 30. Next, the controller 100 controls to start cooling. In this way, the user can remotely control the air-conditioning system 104 and the like whenever he likes with the terminal device 40.

In addition, the user can browse the operating status, the operating mode, the target temperature, the operating history, and the like of the air-conditioning system 104 with the application of the terminal device 40.

For example, the user can start the application of the terminal device 40, and input an instruction for acquiring the operating status of the air-conditioning system 104. This instruction is transmitted to the server 30 via the communication network 50, and is further transmitted to the controller 100 from the server 30. The controller 100 acquires the operating status of the air-conditioning system 104, and transmits the acquired information to the server 30. The server 30 transmits the acquired operating status to the terminal device 40. Next, the terminal device 40 displays the acquired operating status on the display. Hence, the user can remotely browse the operating status of the air-conditioning system 104 whenever he likes.

In this embodiment, the terminal device 40 does not directly access the controller 100, but indirectly accesses the controller via the server 30. However, a structure in which the terminal device 40 directly accesses the controller 100 can be employed without the server 30.

Figure 2A:
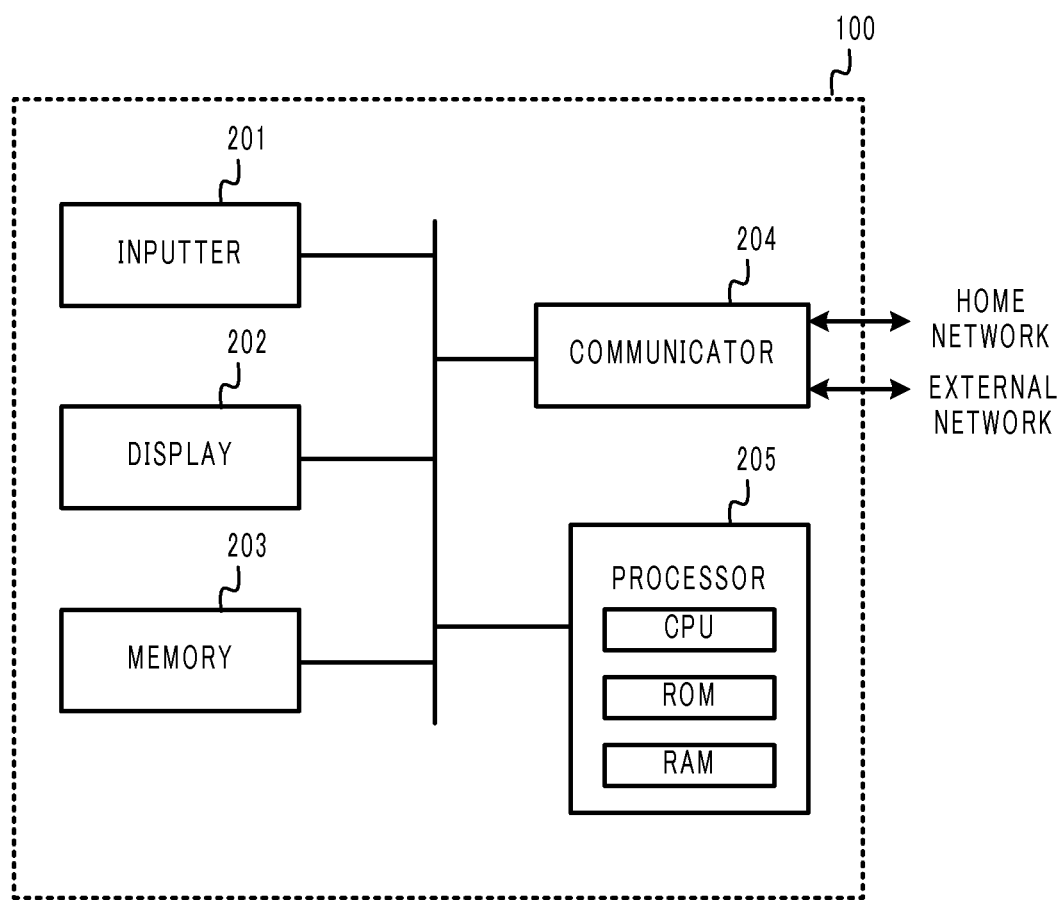
FIG. 2A is a diagram illustrating a structure of a controller.

Next, an explanation will be given of a hardware structure of the controller 100 with reference to FIG. 2A. The controller 100 monitors and controls the entire home network 10. In addition, the controller 100 receives a control instruction from the external network 20, and controls the units and the like within the home network 10 based on the instruction.

An inputter 201 includes input devices, such as buttons, a keyboard, and a touch panel. The inputter 201 receives an instruction input by the user.

A display 202 includes a display device such as a liquid crystal display.

A memory 203 includes a non-volatile memory. The memory 203 stores therein an operating system (OS), programs, and various data executed by a processor 205.

A communicator 204 includes an NIC (Network Interface Card), and communicates with each of the units within the home network 10. In addition, the communicator 204 communicates with, for example, the server 30 on the external network 20.

In this embodiment, the communicator 204 exchanges data with the terminal device 40 via the server 30. However, a structure in which the communicator 204 directly exchanges data with the terminal device 40 without the server 30 can be also employed.

The processor 205 includes, for example, a Central Processing Unit (CPU), a Read Only Memory (ROM), and a Random Access Memory (RAM) serving as a work area. The processor 205 executes the program stored in the memory 203, and controls the entire controller 100.

A general computer server, a main frame, a personal computer, or the like is applicable as the controller 100.

The server 30 of this embodiment employs the same hardware structure as that of the controller 100.

Figure 2B:
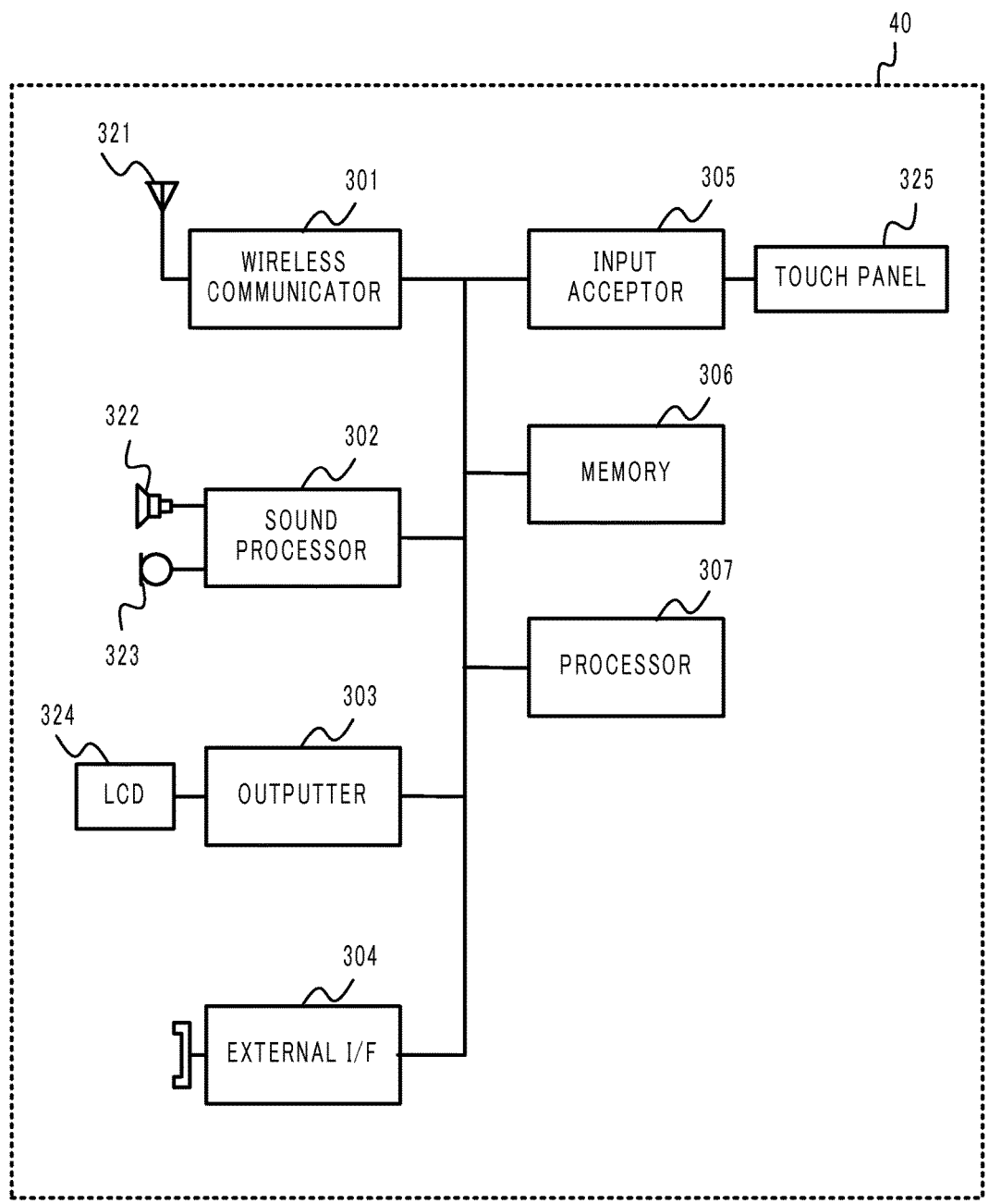
FIG. 2B is a diagram illustrating a structure of a terminal device.

Next, an explanation will be given of a hardware structure of the terminal device 40 with reference to FIG. 2B. The terminal device 40 of this embodiment is a tablet type information terminal which the user easily carry.

A wireless communicator 301 exchanges data with the server 30 on the communication network 50 and the other various computers with wireless communication via an antenna 321.

A sound processor 302 collects sound such as the user's voice via a microphone 323, converts the collected sound into sound signals via an A/D converter of the sound processor 302, and inputs the sound signals into a processor 307. In addition, the sound processor 302 decodes sound data stored in a memory 306 to reproduce sound, and outputs the sound to a speaker 322.

An outputter 303 processes image data with an imaging operation processor (unillustrated) of the processor 307 or of the outputter 303, and records the processed data in a frame buffer. Image information recorded in the frame buffer is converted into image signals at a predetermined synchronization timing such as vertical synchronization, and is output to an Liquid Crystal Display (LCD) 324.

A touch panel 325 is disposed and overlaid on the surface of the LCD 324, and includes multiple touch sensors which detect a touch by the user and the position of the touch. Note that the LCD 324 and the touch panel 325 are sometimes collectively referred to as a "touch screen".

An external I/F 304 is connectable with an external memory such as a flash memory card, and is capable of inputting/outputting data therewith. In addition, the external I/F 304 includes an interface which connects the terminal device 40 to an external device via a USB (Universal Serial Bus) connection, and which is capable of inputting/outputting data with the external device. The external I/F 304 may further include an interface that enables it to connect to other external devices.

An input acceptor 305 accepts an operation signal from the touch panel 325, and inputs a key code signal corresponding to the operation signal to the processor 307. The processor 307 determines an operation detail based on the input key code signal. The user can input any character data and operation commands with the touch panel 325.

The operation commands are, for example, a command that instructs starting or terminating of the application, a command that changes the operating mode of the air-conditioning system 104, and a command that specifies the target temperature of the air-conditioning system 104. The unit to be controlled is not limited to the air-conditioning system 104, and may be any unit which has a communication function, and which is controllable by the controller 100.

The memory 306 includes a ROM and a RAM. The ROM stores therein beforehand the OS, the program and the like that are necessary to control the entire terminal device 40. The RAM temporarily stores the data and the program that are necessary for the processor 307 to execute a process. In addition, some areas in the RAM are a non-volatile memory area that stores setting data for the terminal device 40, personal data such as an address book, downloaded data, and the like.

The processor 307 executes the OS and the program both stored in the memory 306, thereby controlling the entire terminal device 40. The processor 307 transmits control signals and data to each section of the device, or receives response signals and data therefrom. The process executed by the processor 307 will be explained later in detail.

Next, an explanation will be given of the detail of the unit controlling process executed by the energy management system 1 of this embodiment.

Figure 3:
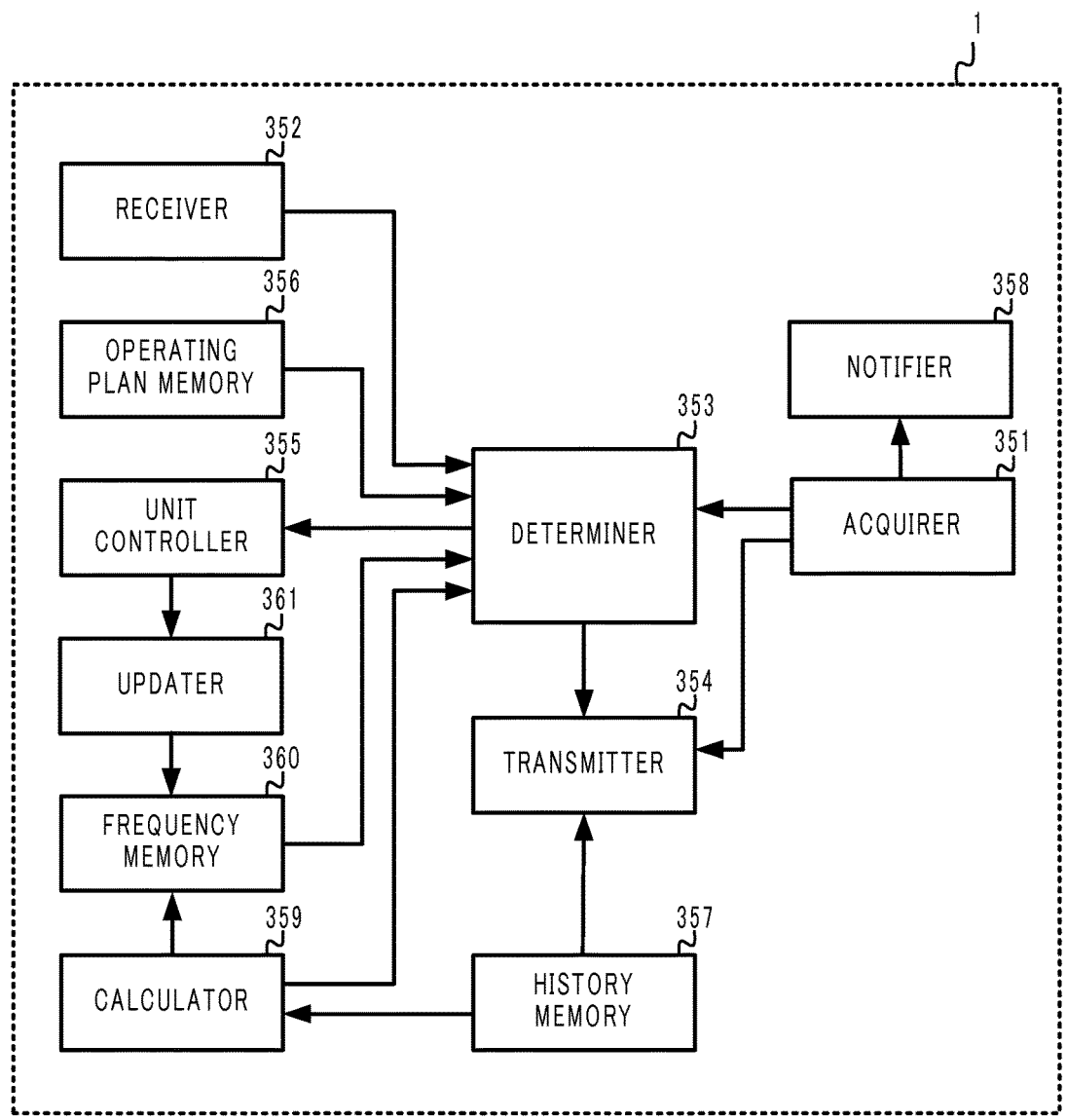
FIG. 3 is a diagram illustrating a functional structure of the energy management system.

FIG. 3 illustrates a functional structure of the energy management system 1.

FIG. 4 illustrates a flow of the unit controlling process.

Although it is not illustrated in FIG. 4, as explained above, the processor 205 of the controller 100 is repeatedly acquiring the environmental parameters, such as the operating status of the unit installed in the home, images captured by the camera installed in the home, the temperature, the humidity, the brightness, and the like measured by the sensors installed in the home. That is, the processor 205 of the controller 100 serves as an acquirer 351 that acquires the environmental parameters.

First, when the user starts the application and inputs a desired instruction, the processor 307 of the terminal device 40 transmits a command corresponding to the inputted request for a remote operation to the controller 100 via the server 30 (step S401).

The controller 100 receives the remote control request from the terminal device 40. That is, the processor 205 and the communicator 204 of the controller 100 work together to function as a receiver 352.

More specifically, the processor 307 of the terminal device 40 transmits a command corresponding to the inputted request for a remote operation to the server 30. The server 30 receives the command, and confirms that this command has been transmitted from the terminal device 40 that has a predetermined authority. When the sender which has sent the command has the predetermined authority, the server 30 transmits the command to the controller 100.

Although the process by the server 30 is unillustrated in FIG. 4, more precisely, the sender 30 relays the exchanging of the data between the terminal device 40 and the controller 100. In order to facilitate understanding for the present disclosure a relaying process by the server 30 will be omitted in the following explanation for the communication between the terminal device 40 and the controller 100.

The processor 205 of the controller 100 determines whether or not to transmit query data that contains a query on whether or not to execute according to the received command, and the environmental parameters, to the terminal device 40 that is the sender, after receiving the command. That is, the processor 205 of the controller 100 serves as a determiner 353 that determines whether to make a query to the terminal device 40.

The processor 205 transmits the query data to the terminal device 40 when determining to transmit the query data to the terminal device 40 (step S402). That is, the processor 205 and the communicator 204 of the controller 100 work together to function as a transmitter 354 that transmits the query data to the terminal device 40.

The environmental parameters contained in the query data may be a source for the user to determine whether or not to permit the controller 100 to execute a process.

The processor 205 may transmit the query data to the terminal device 40 every time when this processor receives a command, or may determine whether or not to transmit the query data based on a predetermined condition.

For example, the processor 205 may transmit the query data to the terminal device 40 at a constant time cycle until receiving a notification of permission to be explained later after receiving the command. That is, when a notification of permission does not come from the terminal device 40 within a predetermined time period, the processor 205 re-transmits the query data. The number of retries can be set as needed. The processor 205 may retry up to the predetermined times until receiving a permission response, and then executes a process when permitted. On the other hand, if there is not the permission response after the processor 205 retries up to the predetermined times, the processor does not execute the process.

In addition, the memory 203 of the controller 100 may store an operating plan (schedule) of the energy management system 1 inputted beforehand by the user, and if receiving the command at the time when this operating plan is scheduled, the processor 205 may transmit the query data to the terminal device 40 to confirm whether or not to surely execute the process. That is, the memory 203 of the controller 100 serves as an operating plan memory 356.

If the operating plan is not scheduled at the time when the command is received, the processor 205 may execute the command without transmitting the query data to the terminal device 40. That is, the processor 205 may control the unit to be controlled according to the command. The processor 205 transmits the query data to the terminal device 40 prior to the execution, and executes the process when permitted or does not execute the process when not permitted since there is a possibility that the detail of the instruction duplicates or contradicts that of the schedule when the schedule is registered beforehand. On the other hand, when the schedule is not registered, the processor 205 immediately follows the instruction, and makes the unit to be controlled execute the process.

In addition, when the instruction from a certain terminal device 40 is the first instruction of the day from the terminal device 40, the processor 205 may transmit the query data to this terminal device 40, and when the instruction is the instruction after the first instruction of the day, the processor may omit the transmission of query data. In this case, when received the query data from a certain terminal device 40 multiple times on the same day, only the first query data is transmitted to the terminal device 40, and the process is executed when permitted or is not executed when not permitted. After the first transmission of the query data, when receiving a remote operation request, the processor 205 immediately follows the instruction and makes the unit to be controlled execute the process.

The detail of the first request and that of the second request may differ from each other. Alternatively, only when the detail of the first request and that of the second request are consistent with each other, the processor 205 may omit the transmission of the query data of the second request.

In addition, if the time when the remote operation request is received from the terminal device 40 is later than the time when the request has been previously received from the same terminal device 40 by a predetermined time, the processor 205 may transmit the query data to the terminal device 40, and the processor 205 may omit the transmission of the query data to the terminal device 40 otherwise.

For example, in the case that the predetermined time is set to one hour, if the second request is received after one hour has elapsed since the first request has been received, the processor 205 transmits the query data to the terminal device 40, and executes the process when permitted, or does not execute the process when not permitted. On the other hand, if the second request is received before one hour has elapsed since the first request has been received, the processor 205 immediately follows the request, and makes the unit to be controlled execute the process.

In addition, if the detail of the received request does not meet a predetermined condition, the processor 205 may transmit the query data to the terminal device 40, and if the detail of the received request meets the predetermined condition, the processor may omit the transmission of the query data to the terminal device 40.

The predetermined conditions are, for example, "the unit to be controlled is a unit installed in the interior of the home", "an amount of change in the target temperature is less than 5° C.", "the time when the instruction is received is between a first time and a second time", and "nobody is home". Such conditions are optional. Hence, such the system operation can be enabled in which the query data is always transmitted only for the operations or the units which have relatively high risk.

Returning to the explanation with reference to FIG. 4, the processor 307 of the terminal device 40 receives the above query data from the controller 100, and displays on the LCD 324 a screen that allows the user to input an instruction on whether or not to permit the execution of the process. The processor 307 accepts the instruction input by the user on whether or not to permit the execution to the query (step S403).

In this case, the processor 307 of the terminal device 40 displays a button corresponding to a permitting instruction and a button corresponding to a refusal instruction, and also displays information indicating the environmental parameters that can be a source for the user to determine whether or not to permit the execution.

For example, in the case that there are two air-conditioning systems 104 installed in the home, the processor 205 of the controller 100 sequentially acquires the operating status of the air-conditioning systems 104 respectively. If an instruction to set one air-conditioning system 104 to heating operation is transmitted from the terminal device 40 at the time when the other air-conditioning system 104 is operating under cooling operation, the processor 205 transmits message data that contains a message such as "the other air-conditioner is set to cooling, is this air-conditioner set to heating?" to the terminal device 40 together with the query data. When receiving the message data, the processor 307 of the terminal device 40 displays the message contained in the message data on the LCD 324.

Alternatively, the processor 205 of the controller 100 sequentially acquires monitoring data from the monitoring device 108. Next, if an electric window is open at the time when receiving an instruction to start the operation of the air-conditioning system 104 from the terminal device 40, the processor 205 transmits the message data that contains messages such as "window open. Close window" to the terminal device 40 together with the query data. When receiving the message data, the processor 307 of the terminal device 40 displays the message contained in the message data on the LCD 324.

For example, when receiving a request for starting the operation of the air-conditioning system 104 from the terminal device 40, the processor 205 of the controller 100 transmits the environmental parameters at a point of time when the request is received to the terminal device 40. The terminal device 40 displays information indicated by the environmental parameters on the LCD 324. This allows the user to browse the displayed information, determine whether or not to permit the execution, and input a remote operation request.

In addition, for example, when receiving a request for starting the operation of the air-conditioning system 104 from the terminal device 40, the processor 205 of the controller 100 transmits a still image or a motion image around the air-conditioning system 104 captured at the point of time when the request is received to the terminal device 40. The terminal device 40 displays the received still image or motion image on the display. This allows the user to browse the displayed still image or motion image, determine whether or not to permit the execution, and input a remote operation request.

When the user touches the button corresponding to a request for not permitting the execution in the step S403, the processor 307 of the terminal device 40 terminates the unit controlling process. In this case, the request transmitted in the step S401 is canceled.

A structure may be employed in which the processor 307 of the terminal device 40 gives a response indicating not to permit the execution to the controller 100, and the controller 100 that have received this response terminates the unit controlling process. Alternatively, a structure may be employed in which the processor 307 of the terminal device 40 does not respond to the query data, but the processor 205 of the controller 100 detects a time-out for the response to the query data, and terminates the unit controlling process.

On the other hand, when the user touches the button corresponding to a request for permitting the execution, the processor 307 of the terminal device 40 notifies the controller 100 of the permission to the request transmitted in step S401 (step S404).

When receiving the notification of the permission to execute, the processor 205 of the controller 100 instructs the unit to be controlled to execute the process according to the request received in step S401 (step S405). The unit to be controlled executes the process according to the instruction from the controller 100 (step S406). For example, the air-conditioning system 104 starts cooling at the specified target temperature according to the request. The processor 205 of the controller 100 serves as a unit controller 355.

The unit to be controlled transmits a response indicating that the process has been executed according to the request to the controller 100 (step S407).

The processor 205 of the controller 100 receives the response from the unit to be controlled. In addition, the processor 205 transmits a response indicating that the unit to be controlled has executed the process to the terminal device 40 that is the sender of the request in step S401 (step S408).

The processor 307 of the terminal device 40 receives the response indicating that the unit to be controlled has executed the process, which is a result to the request, and displays the result to the request on the display from the controller 100 (step S409).

As explained above, according to this embodiment, although the controller 100 receives a remote operation request from the terminal device 40, the controller does not immediately execute it, but has the user confirm whether or not the instruction is actually intended by the user, and executes the process after it is confirmed that the instruction is actually intended by the user. In addition, the user can understand, before executing the process, the current environment within the home, the effect and so on by the operation of the air-conditioning system 104 or the like, and can cancel the request when the user determines that there is a problem in safety. Hence, the energy management system 1 can enhance safety.

Conventionally, according to this type of terminal devices, when the terminal device is put in a pocket, for example, there is a possibility that a button is unintentionally touched within the pocket, and a command is transmitted from the application against the user's will, and thus a false request is made with an operation which is not actually intended by the user. According to the energy management system 1 of this embodiment, however, the user is allowed without a large burden to confirm whether or not the instruction is actually intended, thereby enhancing safety.

Second Embodiment

Next, an explanation will be given of a unit controlling process by an energy management system 1 of a second embodiment with reference to FIG. 5. In this embodiment, when a remote operation from the terminal device 40 is given, the energy management system 1 notifies the user and persons around there of the execution of the remote operation.

First, when the user starts the application and inputs a desired remote operation request, the processor 307 of the terminal device 40 transmits a command corresponding to the inputted request to the controller 100 via the server 30 (step S501).

The processor 205 of the controller 100 instructs the unit to be controlled to execute a process according to the request received in step S501 (step S502).

The unit to be controlled outputs a notification indicating that the process is executed by a remote operation (step S503).

More specifically, the unit to be controlled outputs from the speaker a second sound indicating a remote operation that is different from the first sound. This first sound is outputted when an instruction is given through, for example, a direct touch operation to the operation panel. When there is a person in the home, this person can easily know that a remote operation is given to the unit by distinguishing the sound. The unit to be controlled may give a notification of the remote operation using not only sound, but also an image and a message.

Instead of the unit to be controlled or in addition to the unit to be controlled, the processor 205 of the controller 100 may give a notification indicating that the process is executed according to the remote operation request. Alternatively, instead of the unit to be controlled or in addition to the unit to be controlled, the processor 205 of the controller 100 may give a notification indicating that the remote operation request is received. The processor 205 of the controller 100 serves as a notifier 358.

The unit to be controlled executes the process according to the instructions from the controller 100 (step S504). For example, the air-conditioning system 104 starts cooling at a target temperature specified according to the request.

The unit to be controlled transmits a response indicating that the process has been executed according to the request received in step S501 to the controller 100 (step S505).

The processor 205 of the controller 100 receives the response from the unit to be controlled. In addition, the processor 205 outputs a notification indicating that the process has been executed by the remote operation (step S506).

More specifically, the processor 205 of the controller 100 outputs from the speaker (unillustrated) a sound indicating the execution of the process through a remote operation. When there is a person in the home, this person can easily know that the unit is remotely operated by hearing this sound from the controller 100. The processor 205 may give a notification of the remote operation of the unit with an image and a message in addition to the sound.

In addition, the processor 205 of the controller 100 transmits a response indicating that the unit to be controlled has executed the process to the terminal device 40 that is the sender of the request in step S501 (step S507).

The processor 307 of the terminal device 40 receives from the controller 100 the response indicating that the unit to be controlled has executed the process, which is a result of the request, and displays the result of the request on the display (step S508).

The processor 307 of the terminal device 40 may output from the speaker 322 a sound that notifies that the execution of a remote operation of the unit has occurred in addition to the notification on the display in step S508. In addition, the processor 307 may display an image and a message that notifies of the execution of a remote operation to the unit on the LCD 324 in addition to the output sound.

According to this embodiment, the energy management system 1 notifies around the unit, the controller 100, and the like, so as to facilitate the user to immediately know whether the operation to the unit is a direct operation or a remote operation, or whether or not a remote operation is given. Hence, the user can easily notice a false operation, and thus the energy management system 1 can enhance safety.

The unit to be controlled may record the execution log of the unit controlling process in the memory, and may allow the user to browse the execution log at any time. The notification of the remote operation in step S503 may include the displaying of the execution log.

Likewise, the processor 205 of the controller 100 may record the execution log of the unit controlling process in the memory 203, and may allow the user to browse the execution log at any time. The notification of the remote operation in step S506 may include the displaying of the execution log.

Likewise, the processor 307 of the terminal device 40 may record the execution log of the unit controlling process in the memory 306, and may allow the user to browse the execution log at any time. The displaying of the results in step S508 may include the displaying of the execution log.

Third Embodiment

Next, an explanation will be given of a unit controlling process by an energy management system 1 of a third embodiment with reference to FIG. 6. According to this embodiment, when an event that is expectable beforehand occurs in the unit to be controlled, the controller 100 or the terminal device 40 is notified of the occurrence of the event. When a specific event occurs in the unit to be controlled, an environmental parameters that indicates the occurrence of the specific event is transmitted to the terminal device 40.

First, the unit to be controlled determines whether or not a specific event has occurred (step S601).

An example of the specific event is "a status in which the process is not executable due to a suspension of some of or all of functions due to unit maintenance or a breakdown". In the case that the unit to be controlled is the air-conditioning system 104, when a person who manages such units is cleaning a filter or the unit is operating in the interior cleaning mode, the user is unable to use the air-conditioning system during that time period. In this case, the air-conditioning system 104 determines that the specific event occurs.

Alternatively, another example of a specific event is "a status in which the remaining battery level of the internal battery is equal to or lower than a predefined value". In the case that the unit to be controlled conducts some of or all of the functions with the internal battery, when the battery level remaining is equal to or smaller than the predefined value, this status is likely to affect the execution of the subsequent process. Hence, the unit to be controlled determines that the specific event occurs.

In addition, another example of a specific event may be "a status in which the unit has been continuously operating beyond a reference time period". When the unit has been operating for a long time the execution of the process is likely to be disturbed due to heating. Hence, when continuously operating beyond the reference time, the unit to be controlled determines that the specific event occurs at a point of time when the reference time has elapsed.

Note that, the definition for the specific event is not limited to the examples described above, the unit to be controlled, the controller 100, or the user can set as needed. Available information to define the specific event includes a date, time, a temperature in the home or within the unit, humidity, weather, external information such as an emergency earthquake report, presence/absence of a person, and power ON/OFF of the unit in addition to the above examples.

Next, the unit to be controlled outputs a notification of the occurrence of the specific event when the specific event occurs, and notifies of that around this unit (step S602). This notification may be performed with sound or may be performed by displaying an image and the like.

The unit to be controlled notifies the controller 100 of the occurrence of the specific event when the specific event occurs (step S603).

When receiving the notification of the occurrence of the specific event from the unit, the processor 205 of the controller 100 outputs this notification (step S604). This notification may be performed with sound or may be performed by displaying an image and the like. The processor 205 of the controller 100 serves as the notifier 358 that gives a notification of the occurrence of the specific event.

The processor 205 of the controller 100 may determine whether or not the specific event occurs in the unit.

In addition, the processor 205 of the controller 100 transmits the notification indicating that the specific event occurs in the unit to the terminal device 40 (step S605). The processor 205 may transmit an environmental parameter to the terminal device 40 in addition to the notification indicating that the specific event occurs.

When receiving the notification of the occurrence of the specific event in the unit, the processor 307 of the terminal device 40 outputs the notification (step S606). This notification may be performed with sound or may be performed by displaying an image and the like.

Next, the processor 307 of the terminal device 40 restricts the functions controllable from the terminal device 40, among the functions of the unit, based on the details of the received notification (step S607).

For example, when receiving the notification of the occurrence of the specific event in the air-conditioning system 104, the processor 307 disables the software button relating to the control for the air-conditioning system 104 to be operated by the user in the application screen. Hence, it becomes possible to prevent the user from giving a false instruction in the case that the unit is out of service.

According to this embodiment, the energy management system 1 can perform a control that does not accept a remote operation according to the occurrence of the event in the unit, thereby enhancing the safety.

When the specific event is "a status in which the unit maintenance completes", and the "restriction for the functions" in step S607 is set to "release the restriction for the functions", the energy management system 1 can perform a control to "accept" a remote operation according to the occurrence of the specific event in the unit, further improving the user-friendliness.

Fourth Embodiment

Next, an explanation will be given of a unit controlling process by an energy management system 1 of a fourth embodiment with reference to FIGS. 7, 8, and 9. According to this embodiment, the controller 100 prompts the user to confirm whether to actually execute the process based on whether a remote operation request from the terminal device 40 is a request for a daily operation operated at a relatively high frequency or a request of an unusual operation operated at a relatively low frequency.

First, when the user starts the application and inputs a desired request, the processor 307 of the terminal device 40 transmits a command corresponding to the inputted request to the controller 100 via the server 30 (step S701).

The processor 205 of the controller 100 determines whether the request indicated by this command is for a daily operation or for an unusual operation for the user when receiving the command (step S702).

The daily operation is a user operation corresponding to a request that has been received previously from the terminal device 40 at a relatively high frequency, among all requests received from the terminal device 40. The unusual operation is a user operation corresponding to a request that has been received previously from the terminal device 40 at a relatively low frequency, among all requests received from the terminal device 40. The processor 205 of the controller 100 sorts the requests received from the terminal device 40 into a request belonging to the daily operation, and a request belonging to the unusual operation.

More specifically, the processor 205 determines whether the command detail indicates the daily operation or the unusual operation based on an operation history table 800 exemplified in FIG. 8, and a frequency table 900 exemplified in FIG. 9. In FIG. 8 and FIG. 9, the unit to be controlled is the air-conditioning system 104. When there are multiple units to be controlled, the processor 205 creates the operation history table 800 and the frequency table 900 for each unit, and stores those created tables in the memory 203. The memory 203 of the controller 100 serves as a history memory 357 and a frequency memory 360. The processor 205 of the controller 100 serves as a calculator 359 that calculates the frequency of each request.

The sender of the command, the received command, and the time when the command has been received, are stored in association with one another in the operation history table 800. When receiving the command from the terminal device 40 in step S701, the processor 205 updates the operation history table 800.

The processor 205 may record most a predetermined number of recent histories in the operation history table 800, or may record the previous histories within a predetermined time period in the operation history table 800. In addition, the processor 205 may truncate the operation history table 800 based on an instruction given by the user.

The processor 205 updates the frequency table 900 that aggregates the frequency of commands based on the operation history table 800 in step S709 to be explained later. For example, the processor 205 calculates the number of receptions for each sender of commands and for each kind of command. The processor 205 determines that a command received a number of times equal to or greater than a threshold is the command belonging to the daily operation, and a command received a number of times smaller than the threshold is the command belonging to the unusual operation. Subsequently, the processor 205 stores the determination result for the daily operation/unusual operation in the frequency table 900. The threshold is an optional value. The processor 205 of the controller 100 serves as an updater 361.

For example, in the case that the threshold in FIG. 9 is set to "30", even if the command is "Power ON" in common, when the identifier of the sender is "ABC", the command is sorted to the unusual operation. Conversely, when the identifier of the sender is "XYZ", the command is sorted to the daily operation. The determination result for daily operation/unusual operation may vary according to the sender.

The processor 205 may update the frequency table 900 based on the predetermined times of the most recent histories, or may update the frequency table 900 based on the histories within the predetermined time period. In addition, the processor 205 may truncate the frequency table 900 based on the instruction from the user.

Next, the processor 205 of the controller 100 transmits the query data that contains a query on whether or not to execute the process according to the received command and the environmental parameters to the terminal device 40 when determining that the command received in step S701 belongs to the unusual operation (step S703).

When determining that the command received in step S701 belongs to the daily operation, the processor 205 of the controller 100 does not transmit the query data, but proceeds the process to step S706 to be explained later.

When receiving the query data from the controller 100, the processor 307 of the terminal device 40 displays a screen for accepting a input from a user that specifies whether to permit or refuse the execution of the process on the display. The processor 307 accepts the input from the user for a permission/refusal to the request for permission (step S704).

When the user touches the button corresponding to the request for refusing the execution of the process, the processor 307 of the terminal device 40 terminates the unit controlling process. In this case, the request transmitted in the step S701 is canceled.

Conversely, when the user touches the button corresponding to the request for permitting the execution of the process, the processor 307 of the terminal device 40 notifies the controller 100 of the permission to the request (original request) transmitted in step S701 (step S705).

When receiving the notification indicating that the process execution is permitted, the processor 205 of the controller 100 instructs the unit to be controlled to execute the process according to the request received in step S701 (step S706). The unit to be controlled executes the process according to the instruction from the controller 100 (step S707).

The unit to be controlled transmits a response indicating that the process has been executed according to the original request to the controller 100 (step S708).

The processor 205 of the controller 100 receives the response from the unit to be controlled. Then, the processor 205 updates the frequency table 900 (step S709).

The frequency table 900 stores the frequency of commands which are received from the terminal device 40 and which has been actually executed. Then, the updated frequency table 900 is utilized for the determination of the next unit controlling process on whether the command belongs to the daily operation or the unusual operation in step S702. By updating the frequency table 900, the controller 100 determines whether or not the command belongs to the daily operation or the unusual operation in the subsequent unit controlling processes based on the updated frequency table 900. This enables the controller 100 to learn whether or not to determine that the command belongs to the daily operation or to the unusual operation.

In this embodiment, the processor 205 updates the frequency table 900 after the execution of the process in step S706. This is for removing a case from frequencies to be updated, in which the process is not executable due to some reasons even though the execution is instructed in step S705. Note that the processor 205 may update the frequency table 900 regardless of whether or not the unit has actually executed the process.

In addition, the processor 205 transmits a response indicating that the unit to be controlled has executed the process to the terminal device 40 that is the sender of the request in step S701 (step S710).

The processor 307 of the terminal device 40 receives the response indicating that the unit to be controlled has executed the process, which shows a result of the request, from the controller 100, and displays the result to the request on the display (step S711). By browsing the displayed result, the user can confirm that the user's request has actually been executed.

According to this embodiment, the energy management system 1 can learn the tendency of the requests from the terminal device 40, thereby enhancing the safety. When receiving a request that has hardly received previously, the energy management system 1 has the user confirm whether or not the given request is actually intended by the user, thereby preventing the user from giving a false operation.

Fifth Embodiment

Next, an explanation will be given of a unit controlling process by an energy management system 1 of a fifth embodiment with reference to FIGS. 10A to 10E. According to this embodiment, the interface that accepts an input from a user is made more sophisticated, thereby preventing the user from transmitting an unintentional request.

Figure 10A:
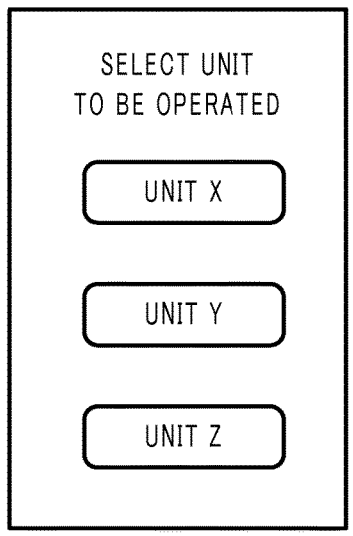
FIG. 10A is a diagram illustrating an example structure of a user interface according to a fifth embodiment.
Figure 10B:
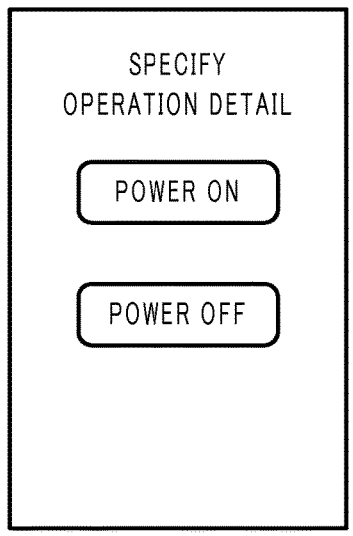
FIG. 10B is a diagram illustrating another example structure of a user interface according to the fifth embodiment.

An example structure of a user interface that accepts an input in step S401 or in step S701 in the above embodiments is illustrated in FIG. 10A and FIG. 10B. Such interface is displayed on the LCD 324 when the application is executed.

FIG. 10A illustrates a user interface that accepts an input of selecting the unit to be controlled. The display displays software buttons corresponding to the unit selectable by the user. The user touches any software button, thereby selecting the desired unit.

FIG. 10B illustrates a user interface that accepts an input for selecting the details of a request for the selected unit. The display displays software buttons corresponding to the details of the request selectable for the user. The user touches any software button, thereby selecting the desired request.

Figure 10C:
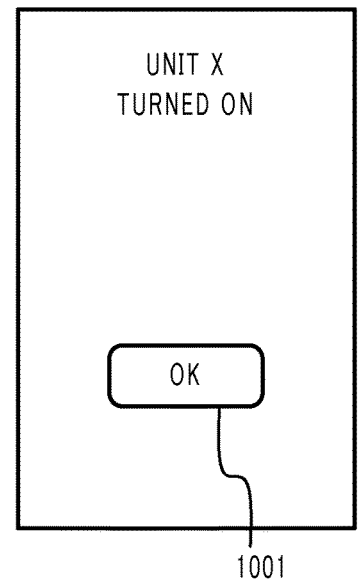
FIG. 10C is a diagram illustrating another example structure of a user interface according to the fifth embodiment.
Figure 10D:
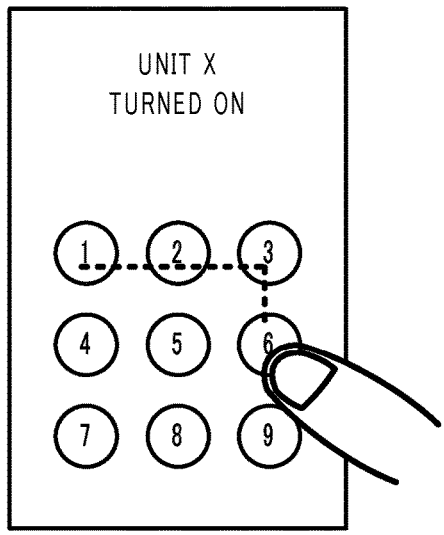
FIG. 10D is a diagram illustrating another example structure of a user interface according to the fifth embodiment.
Figure 10E:
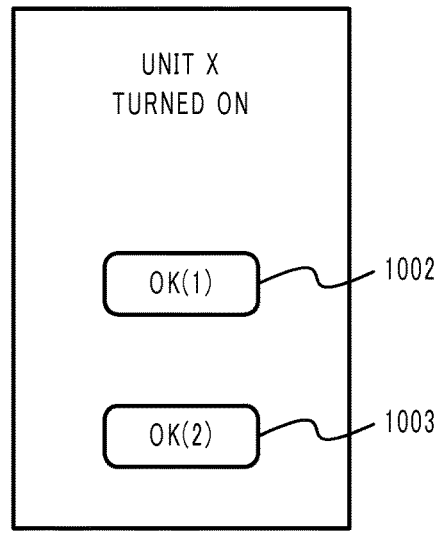
FIG. 10E is a diagram illustrating another example structure of a user interface according to the fifth embodiment.

Next, an example structure of the user interface that accepts an input of permitting or refusing the query in step S403 or step S704 in the above embodiments is illustrated in FIG. 10C, FIG. 10D, and FIG. 10E. Each of the user interfaces is displayed on the LCD 324 when the application is executed.

In FIG. 10C, the processor 307 of the terminal device 40 displays a button 1001 for permitting the process to the query on the LCD 324. When the user touches this button 1001, the processor 307 of the terminal device 40 notifies the controller 100 of the permission in step S404 or step S704.

Conversely, when the user does touch the button 1001, the processor 307 will not notify the controller 100 of the permission. That is, the request transmitted in step S401 or step S701 is canceled, and no process will be executed.

The processor 307 of the terminal device 40 may display a button for refusing the process execution to the query on the LCD 324 together with the button 1001 for permitting the process execution in response to the query. When the button for refusing the process execution is touched, the unit controlling process may be terminated.

In FIG. 10D, the processor 307 of the terminal device 40 displays multiple software keys on the LCD 324. In this figure, nine numeric keys from 1 to 9 are displayed. When the software keys are selected in a predetermined order, the processor 307 of the terminal device 40 notifies the controller 100 of the permission in step S404 or step S704.

Alternatively, when the user traces the touch screen with a finger, for example, touches the numbers in a predetermined order, such as 1→2→3→6→5→8, the processor 307 of the terminal device 40 notifies the controller 100 of the permission in step S404 or step S704.

Conversely, when the user does not touch the numbers in the predetermined order, the processor 307 will not notify the controller 100 of the permission. That is, the request transmitted in step S401 or step S701 is canceled, and the process will not be executed.

In FIG. 10E, the processor 307 of the terminal device 40 displays multiple buttons 1002 and 1003 for permitting the execution of the process to the query on the LCD 324. When the user touches the buttons 1002 and 1003 simultaneously, the processor 307 of the terminal device 40 notifies the controller 100 of the permission in step S404 or step S704.

Conversely, when both buttons 1002 and 1003 are not touched simultaneously, the processor 307 will not notify the controller 100 of the permission. That is, the request transmitted in step S401 or step S701 is canceled, and the process will not be executed.

By making the structure of the user interface sophisticated in this way, the energy management system 1 can prevent the user from a false operation, thereby enhancing the safety.

Sixth Embodiment

Next, an explanation will be given of a unit controlling process by an energy management system 1 of a sixth embodiment with reference to FIG. 11. According to this embodiment, when there is an input to the unit to be controlled not from a remote operation, but from the operation panel directly, all remote operations from the terminal device 40 will not be accepted for a certain time period.

First, when receiving an input not from a remote operation but from a direct operation (step S1101), the unit to be controlled executes the process according to the received input (step S1102).

When executing the process according to the input from the direct operation, the unit prohibits any remote operation for a certain time period after the process execution (step S1103).

The length of the certain time period is optional, and the time length may be set differently for each unit or for each function. In addition, the controller 100 may set the length of the certain time period, and notify the unit of the length beforehand.

The start point (starting time) of the certain time period is after the process execution in step S1102 according to this embodiment, but may be a point of time when the direct operation is received in step S1101 or may be the same point of time when the process is executed in step S1102. Note that the end point (ending time) of the certain time period is a point of time when the certain time period has elapsed since the starting time.

Even though during the time period in which the remote operation is prohibited, there is a possibility that a remote operation request by the user is received from the terminal device 40 until a denial response is returned in step S1107 to be explained later. When the user inputs a remote operation request during the time period in which the remote operation is prohibited, the processor 307 of the terminal device 40 transmits a command corresponding to the input request to the controller 100 via the server 30 (step S1104).

The processor 205 of the controller 100 instructs the unit to be controlled to execute the process according to the request received in step S1104 (step S1105).

When the instruction in step S1105 is received during the time period in which the remote operation is prohibited, the unit denies the remote operation, and transmits a response indicating that the remote operation is denied to the controller 100 (step S1106).

When receiving the response indicating that the remote operation is denied, the processor 205 of the controller 100 transmits a notification indicating that the remote operation is denied because the direct operation has been given to the unit to the terminal device 40 (step S1107). The processor 205 may transmit the environmental parameters to the terminal device 40 together with the notification indicating that the remote operation is denied, or may transmit only the notification indicating that the remote operation is denied to the terminal device 40.

When receiving the response indicating that the remote operation is denied, the processor 307 of the terminal device 40 displays a result to the instruction, that is to say, information indicating that the process corresponding to the instruction is not executed on the LCD 324 (step S1108). Hence, the user can know that remote operation is not currently accepted because the direct operation has been given.

There is a possibility that a user may request a remote operation immediately after the direct operation was given, because it is difficult for a user who attempts to give a remote operation to understand the current situation within the home. According to this embodiment, a load to the unit can be reduced, which is due to a remote operation given immediately after the direct operation. For example, if cooling operation is instructed by a remote operation immediately after heating operation is instructed by a direct operation, it is necessary for the unit to change the operating mode frequently. This can lead to an excessive load. However the unit can be controlled to be operated safely, by giving a priority to the direct operation, and setting a certain prohibiting time period for the remote operation.

A structure may be employed in which, after when the unit to be controlled notifies the controller 100 of this prohibiting time period after setting the prohibiting time period for the remote operation in step S1103, even if the controller 100 receives a request during the prohibiting time period, the controller may transmit a notification of the denial of the remote operation without giving an execution instruction in step S1105.

In addition, a structure may be employed in which, the unit to be controlled may notify the controller 100 of the prohibiting time period after setting the prohibiting time period for the remote operation in step S1103, the controller 100 may transmit a notification indicating that the prohibiting time period has been set, to the terminal device 40, and the terminal device 40 may not accept the input of a request during the prohibiting time period from a user. For example, the controller 307 of the terminal device 40 may not display or may invalidate the software button for accepting a selection of the unit, and the software button for accepting a selection of the function.

Seventh Embodiment

Next, an explanation will be given of a unit controlling process by an energy management system 1 of a seventh embodiment with reference to FIG. 12. According to this embodiment, the user is enabled to set a prohibition of a remote operation.

The user can directly operate the unit, and set the unit not to accept a remote operation from the terminal device 40. When receiving an instruction of prohibiting a remote operation (step S1201), the unit to be controlled prohibits a remote operation for a certain time period from a point of time when the instruction of prohibiting a remote operation is received (step S1202).

The length of the certain time period is optional, and the time length may be differently set for each unit or for each function. In addition, the controller 100 may set the length of the certain time period, and notify the unit beforehand.

The start point (starting time) of the certain time period is a point of time when the instruction is received in step S1201, and the end point (ending time) of the certain time period is a point of time when the certain time period has elapsed since the starting time.

Even though during the time period in which the remote operation is prohibited, there is a possibility that a remote operation request by the user is received from the terminal device 40 until a denial response is returned in step S1206 to be explained later. When the user inputs a request during the time period in which the remote operation is prohibited, the processor 307 of the terminal device 40 transmits a command corresponding to the input request to the controller 100 via the server 30 (step S1203).

The processor 205 of the controller 100 instructs the unit to be controlled to execute the process according to the request received in step S1203 (step S1204).

When the instruction in step S1204 is received during the time period in which the remote operation is prohibited, the unit denies the remote operation, and transmits a response indicating that the remote operation is denied to the controller 100 (step S1205).

When receiving the response indicating that the remote operation is denied, the processor 205 of the controller 100 transmits a notification indicating that the remote operation is denied by the instruction that prohibits the remote operation to the terminal device 40 (step S1206). The processor 205 may transmit the environmental parameters to the terminal device 40 together with the notification indicating that the remote operation is denied, or may transmit only the notification indicating that the remote operation is denied to the terminal device 40.

When receiving the response indicating that the remote operation is denied, the processor 307 of the terminal device 40 displays a result to the request, that is to say, information indicating that the process corresponding to the request is not executed on the LCD 324 (step S1207). Hence, the user can know that the remote operation is currently prohibited.

According to this embodiment the unit can be controlled to be operated safely, by setting a certain prohibiting time period for a remote operation.

A structure may be employed in which, when the unit to be controlled notifies the controller 100 of the prohibiting time period after setting the prohibiting time period for the remote operation in step S1202, even if the controller 100 receives a request during the prohibiting time period, the controller may transmit a notification of the denial of the remote operation without giving an execution instruction in step S1204.

In addition, a structure may be employed in which, the unit to be controlled may notify the controller 100 of the prohibiting time period after setting the prohibiting time period for the remote operation in step S1202, the controller 100 may transmit a notification indicating that the prohibiting time period has been set, to the terminal device 40, and the terminal device 40 may not accept the input of an instruction during the prohibiting time period from a user. For example, the controller 307 of the terminal device 40 may not display or may invalidate the software button for accepting a selection of the unit, and the software button for accepting a selection of the function.

Eighth Embodiment

Figure 13:
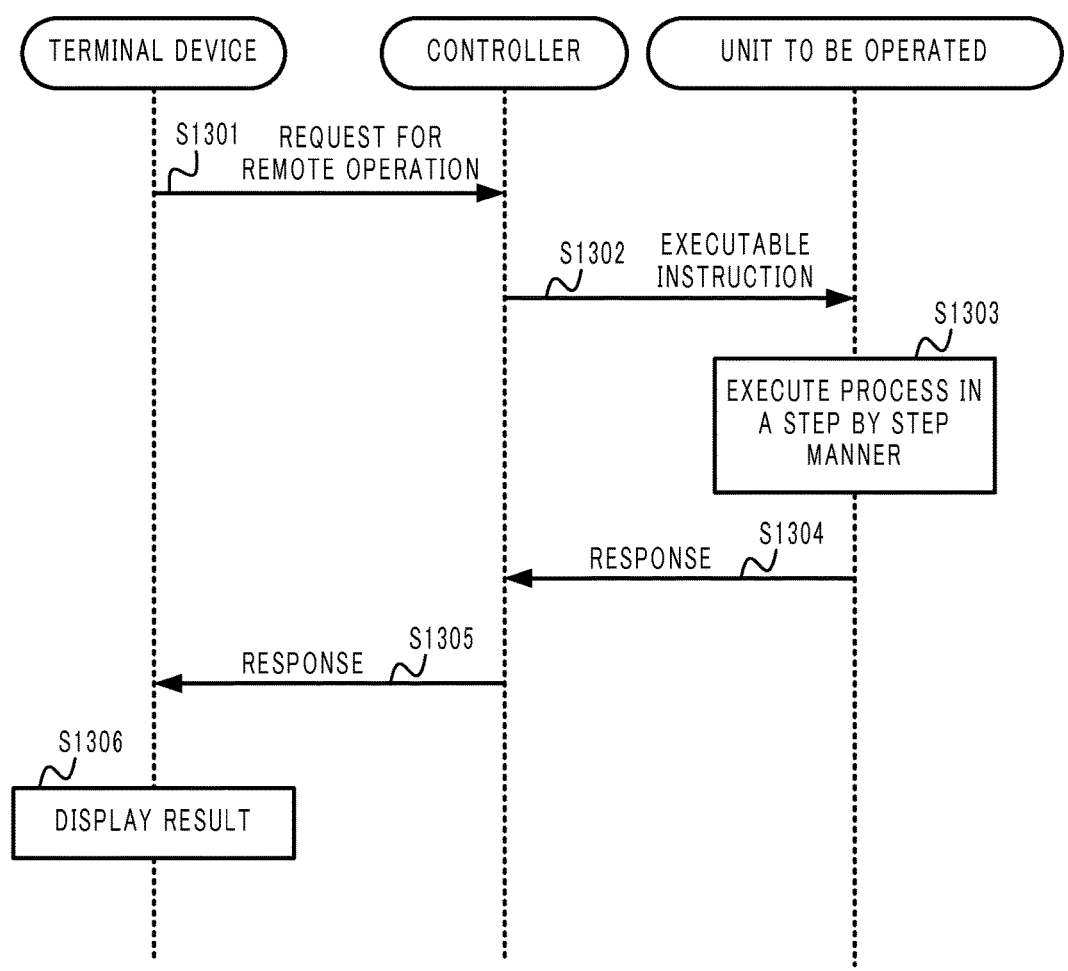
FIG. 13 is a diagram illustrating a flow of a unit controlling process according to an eighth embodiment.

Next, an explanation will be given of a unit controlling process by an energy management system 1 of an eighth embodiment with reference to FIG. 13. According to this embodiment, the unit to be controlled does not maximize the process performance of the unit from the beginning but gradually increases the process performance when executing the process according to a remote operation request.

First, when the user starts the application and inputs a desired request, the processor 307 of the terminal device 40 transmits a command corresponding to the input request, to the controller 100 via the server 30 (step S1301).

The processor 205 of the controller 100 instructs the unit to be controlled to execute the process according to the request received in step S1301 (step S1302).

The unit that has received the command executes the process corresponding to the request in a step by step manner (step S1303). To execute in a step by step manner means to suppress the process performance at the start, and gradually increase the process performance.

For example, in the case that the unit to be controlled is the air-conditioning system 104, and a request for "setting target temperature to 20° C. and performing heating" is transmitted from the terminal device 40 to the controller 100 with a room temperature being at 10° C., when receiving the request in step S1302, the air-conditioning system 104 does not start heating operation at the target temperature of 20° C. from the beginning, but starts heating operation at a slightly lower target temperature (for example, 15° C.). Next, the air-conditioning system increases the target temperature 1° C. by 1° C., and eventually sets the target temperature to be 20° C. By gradually increasing the target temperature in this manner, a sudden change in room temperature and a sudden increase of the load to the unit are avoidable, and thus the energy management system 1 can enhance the safety. Needless to say, the same is true of the temperature setting in the case of cooling operation. The air-conditioning system 104 may gradually decrease the target temperature.

The processor 205 of the controller 100 may set for the unit to be controlled a temperature that is different by a predetermined amount from the target temperature indicated by the instruction from the terminal device 40 at the beginning, and then set the temperature so as to gradually be close to the instructed target temperature. That is, the processor 205 of the controller 100 may sequentially set the target temperatures in a step by step manner for the unit, and the unit may gradually change the target temperature according to the instruction from the controller 100. Hence, in the case of heating, a gradual control is performed in such a way that the target temperature is gradually increased, and eventually reaches the target temperature instructed by the remote operation. In the case of cooling, a gradual control is performed in such a way that the target temperature is gradually decreased, and eventually reaches the target temperature instructed by the remote operation.

In the case that there is a person within the home, if any trouble happens when the unit is operating at a full operation from the beginning, the person within the home can quickly deal with this trouble by deactivating the unit there. However, in the case of a remote operation under a circumstance in which anyone is not present within the home, if any trouble happens, the user who has made the remote operation may be late to notice the trouble, or may fail to notice the trouble in some cases. Hence, by gradually increasing the performance, an occurrence of trouble is suppressed, and an opportunity for the user to notice the trouble is ensured as much as possible.

In addition, the processor 205 can execute the process in a step by step manner based on the environment within the home at a point of time when the remote operation request is received from the terminal device 40, and the content of the remote operation.

For example, when the unit to be remotely operated is the air-conditioning system 104, the processor 205 calculates a difference between the current room temperature and the target temperature indicated by the instruction from the terminal device 40. When the temperature difference is less than a threshold, the processor does not execute the process in a step by step manner, but sets the target temperature according to the request, and makes the air-conditioning system 104 operate with the set target temperature. Conversely, when the temperature difference is equal to or larger than the threshold, the processor 205 executes the process in a step by step manner.

The threshold can be set beforehand, and may be an arbitrary value. For example, in the case that the threshold is set to 5° C., if the difference between the current room temperature and the target temperature indicated by a request from the terminal device 40 is less than 5° C., the processor 205 does not execute the process in a step by step manner, but while immediately set the target temperature according to the request, and makes the air-conditioning system 104 operate with the set temperature. Conversely, when the temperature difference is equal to or greater than 5° C., the processor 205 executes the process in a step by step manner.

Next, the unit to be operated transmits a response indicating that the process has been executed in a step by step manner according to the request, to the controller 100 (step S1304).

The processor 205 of the controller 100 receives the response from the unit to be controlled. In addition, the processor 205 transmits the response indicating that the unit to be controlled has executed the process in a step by step manner to the terminal device 40 that is the sender of the request in step S1301 (step S1305).

The processor 307 of the terminal device 40 receives, from the controller 100, the response indicating that the unit to be controlled has executed the process in a step by step manner, which is a result to the request, and displays the response on the display (step S1306). Hence, the user can know that the unit has executed the process in a step by step manner.

According to this embodiment, the energy management system 1 can enhance the safety.

The processor 205 of the controller 100 may distinguishably set a step-by-step execution of the process or an execution of the process as instructed by the request from the beginning without any restriction, for each unit.

According to this embodiment, the processor 205 of the controller 100 immediately gives an execution instruction to the unit in step S1302 after receiving the request in step S1301, but this embodiment can be combined with the above embodiment. In this case, a structure may be employed in which, this processor may transmit the query data to the terminal device 40 after step S1301, and may give an execution instruction to the unit after the terminal device 40 notifies this processor of the permission to execute.

Ninth Embodiment

Figure 14:
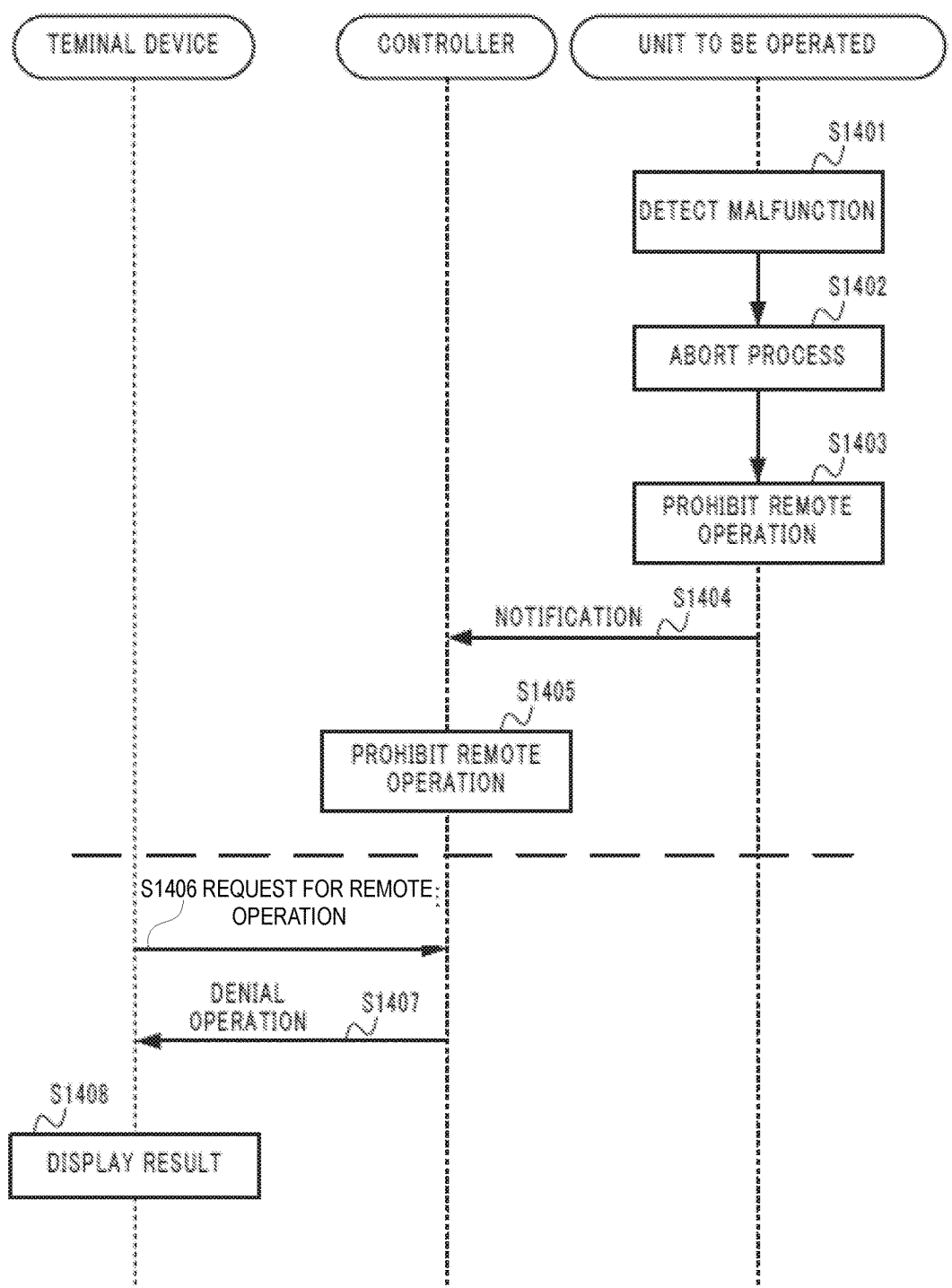
FIG. 14 is a diagram illustrating a flow of a unit controlling process according to a ninth embodiment.

Next, an explanation will be given of a unit controlling process by an energy management system 1 of a ninth embodiment with reference to FIG. 14. According to this embodiment, when a malfunction occurs in the unit, a remote operation is prohibited.

First, the unit to be controlled aborts the currently executing process (step S1402) when detecting a malfunction (step S1401), and prohibits a remote operation (step S1403).

The unit to be controlled may abort the currently executing process and prohibit a remote operation, not only when detecting a malfunction but also when the surrounding environment changes too remarkably to continue to process execution, such as when a temperature keenly rises or falls, the weather suddenly changes, an earthquake occurs, and the communication traffic within the home network 10 remarkably increases, and may.

The unit to be controlled notifies the controller 100 of the prohibition of a remote operation (step S1404). The unit to be controlled may transmit the environmental parameters that contain information on a reason for prohibiting a remote operation, together with the notification indicating that a remote operation is prohibited, to the controller 100.

When receiving the notification indicating that a remote operation is prohibited from the unit, the processor 205 of the controller 100 prohibits a remote operation request from the terminal device 40 (step S1405). After the step S1405, even if the processor 205 receives a remote operation request to the unit from the terminal device 40, this processor does not execute the process corresponding to the request.

Even though the remote operation is prohibited, there is a possibility that a remote operation request by the user is received from the terminal device 40 until a denial response is returned in step S1407 to be explained later. When the user inputs a request, the processor 307 of the terminal device 40 transmits a command corresponding to the inputted request to the controller 100 via the server 30 (step S1406).

The processor 205 of the controller 100 transmits a notification indicating that a remote operation is prohibited due to a malfunction of the unit, an increase in the communication traffic, and the like to the terminal device 40 (step S1407). The processor 205 may transmit the environmental parameter to the terminal device 40 together with the notification indicating that a remote operation is prohibited, or may transmit only the notification indicating that a remote operation is prohibited to the terminal device 40.

When receiving the response indicating that a remote operation is prohibited, the processor 307 of the terminal device 40 displays a result to the request, that is to say, information that the process corresponding to the request is not executed, on the LCD 324 (step S1408). In addition, the processor 307 of the terminal device 40 displays information on a reason for prohibiting a remote operation based on the received environmental parameter, on the LCD 324. Hence, the user can know that the remote operation is currently prohibited and the reason of the prohibition.

According to this embodiment, the energy management system 1 can enhance the safety.

According to this embodiment, the unit to be controlled detects a malfunction, but the controller 100 may detect a malfunction based on the monitoring data received from the monitoring device 108. In this case, processes from step S1401 to step S1404 may be omitted, and when any malfunction is detected, the controller 100 may immediately prohibit a remote operation in step S1405.

Tenth Embodiment

Figure 15:
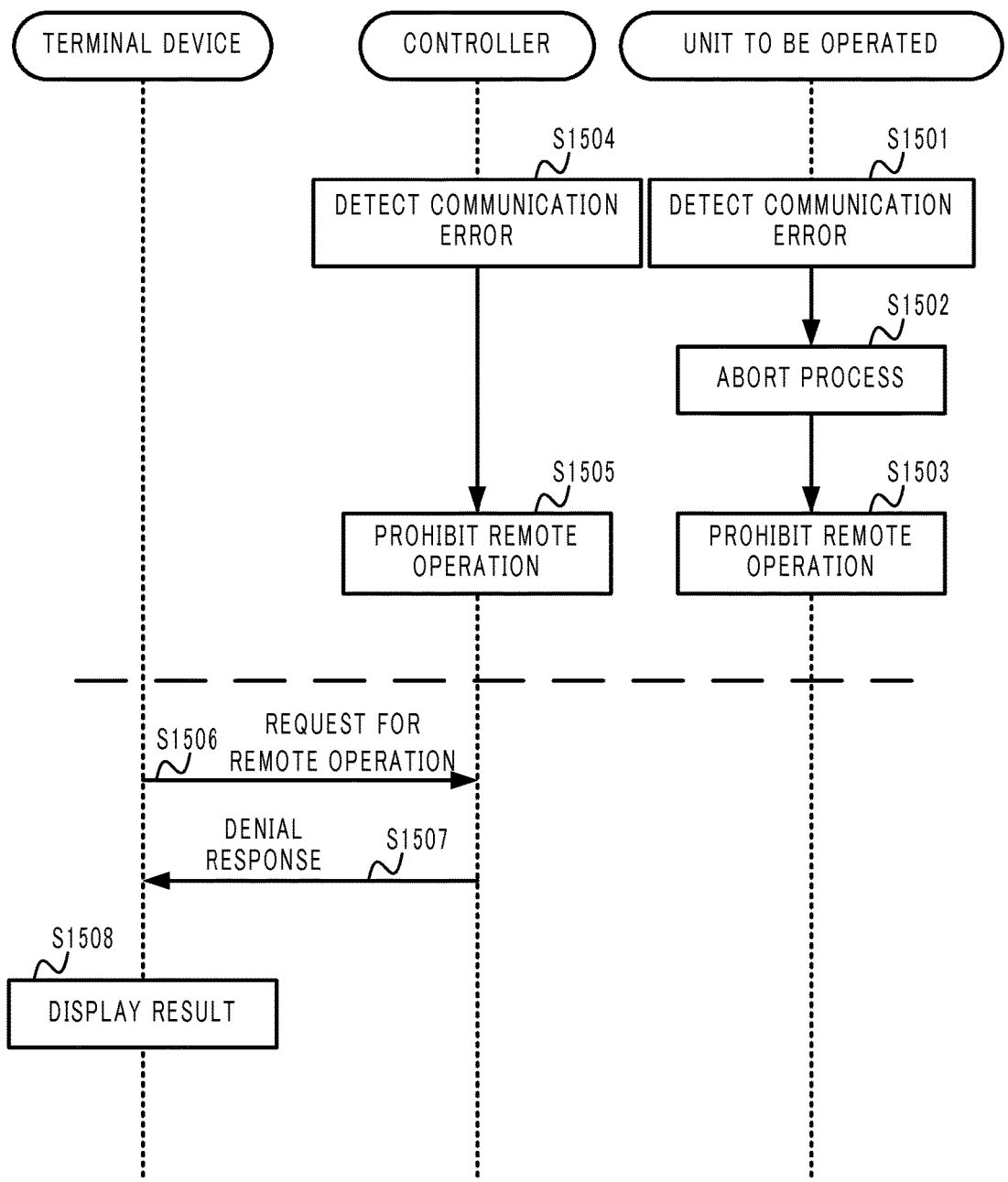
FIG. 15 is a diagram illustrating a flow of a unit controlling process according to a tenth embodiment.

Next, an explanation will be given of a unit controlling process by an energy management system 1 of a tenth embodiment with reference to FIG. 15. According to this embodiment, a remote operation is prohibited when a malfunction such as a disabled communication connection occurs within the home network 10.

First, the unit to be controlled aborts the currently executing process (step S1502) when detecting a communication error, such as a disabled communication with the controller 100 because of a disconnection to the home network 10 (step S1501), and prohibits a remote operation from the terminal device 40 (step S1503).

Likewise, when detecting a communication error, such as a disabled communication with the unit because of a disconnection to the home network 10 (step S1504), the processor 205 of the controller 100 prohibits a remote operation (step S1505).

The unit to be controlled and the controller 100 may both prohibit a remote operation not only when a communication response is quite slow because of not ensuring a predetermined transmission rate.

Even though the remote operation is prohibited, there is a possibility that a remote operation request by the user is received from the terminal device 40 until a denial response is returned in step S1507 to be explained later. When the user inputs a request, the processor 307 of the terminal device 40 transmits a command corresponding to the inputted request to the controller 100 via the server 30 (step S1506).

The processor 205 of the controller 100 transmits a notification indicating that a remote operation is prohibited due to a communication error within the home network 10 and an increase in communication traffic within the home network 10, to the terminal device 40 (step S1507). The processor 205 may transmit environmental parameters to the terminal device 40 together with the notification indicating that a remote operation is prohibited, or may transmit only the notification indicating that a remote operation is prohibited to the terminal device 40.

When receiving the response indicating that a remote operation is prohibited, the processor 307 of the terminal device 40 displays a result of the request, that is to say, information indicating that the process corresponding to the request is not executed, on the LCD 324 (step S1508). In addition, the processor 307 of the terminal device 40 displays information indicating that a remote operation is prohibited due to a communication error within the home network 10, on the LCD 324. Hence, the user can know that the remote operation is currently prohibited and the reason of the prohibition.

According to this embodiment, the energy management system 1 can enhance the safety. In this embodiment, a structure is employed in which the unit aborts the process after detecting a communication error, but a structure can be employed in which a remote operation is prohibited while allowing the unit to keep executing the process.

Eleventh Embodiment

Figure 16:
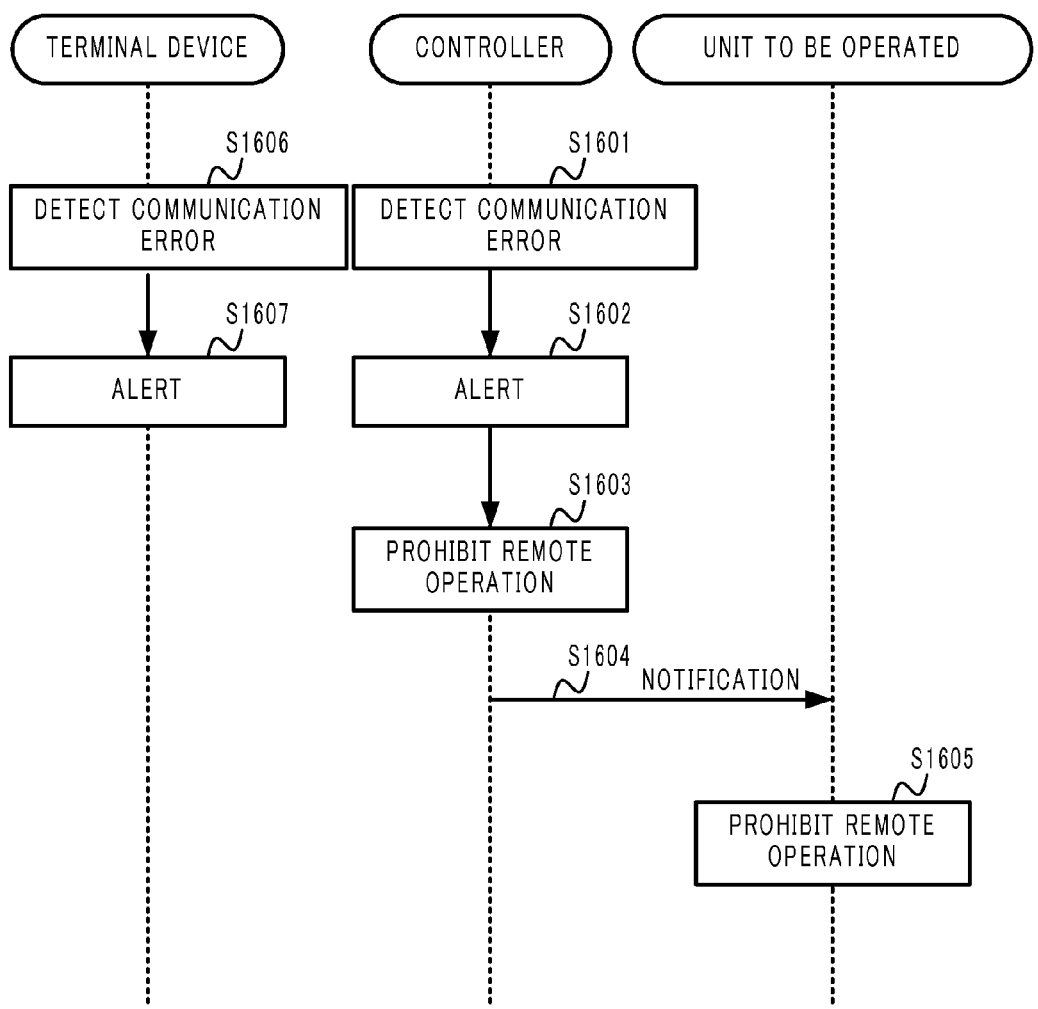
FIG. 16 is a diagram illustrating a flow of a unit controlling process according to an eleventh embodiment.

Next, an explanation will be given of a unit controlling process by an energy management system 1 of an eleventh embodiment with reference to FIG. 16. According to this embodiment, an alert is given when a malfunction such as a disabled communication connection occurs within the external network 20.

First, when detecting a communication error such as a disconnection to the external network 20 (step S1601), the processor 205 of the controller 100 outputs an alert sound or displays an alert screen, thereby giving an alert to the user (step S1602), and prohibits a remote operation from the terminal device 40 (step S1603).

The processor 205 of the controller 100 notifies the unit to be controlled of a prohibition of a remote operation from the terminal device 40 (step S1604).

When receiving a notification indicating that a remote operation from the terminal device 40 is prohibited, the unit to be controlled prohibits a remote operation (step S1605). After this point, the unit only accepts a direct instruction input to the operation panel.

The unit to be controlled may output an alert sound or display an alert screen, thereby letting a person around the unit know that a remote operation is currently unacceptable.

Likewise, when detecting a communication error such as a disconnection to the external network 20 (step S1606), the processor 307 of the terminal device 40 outputs an alert sound or displays an alert screen, thereby giving an alert to the user (step S1607). After this point, the user is not allowed to remotely operate the unit installed in the home with the terminal device 40.

According to this embodiment, the energy management system 1 can enhance the safety.

The present disclosure is not limited to the aforementioned embodiments, and various changes and modifications can be made. In addition, respective structural components in the aforementioned embodiments can be combined freely.

A program that causes a computer to function as a part of or all of the above energy management system 1 may be stored in and distributed with a non-transitory computer-readable recording medium, such as a memory card, a CD-ROM, a DVD, or a MO (Magneto Optical Disk), and installed in another computer to realize the functional components explained above or to execute the above processes.

In addition, the program may be stored in a disk device or the like of a server device over the Internet, and may be downloaded to a computer or the like in a manner superimposed on carrier waves.

As explained above, according to the aforementioned respective embodiments, the safety of a remote control to the unit installed in a home can be further enhanced.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The present application claims a priority based on Japanese Patent Application No. 2013-093521, the entire contents of which are herein incorporated in this specification by reference.

REFERENCE SIGNS LIST

1 Energy management system
10 Home network

20 External network
30 Server
40 Terminal device
50 Communication network
100 Controller
101 Independent switching board
102 Power generating system
103 Electricity storing system
104 Air-conditioning system
106 IH cooking heater
107 Household electric appliance
108 Monitoring device
201 Inputter
202 Display
203 Memory
204 Communicator
205 Processor
301 Wireless communicator
302 Sound processor
303 Outputter
304 External I/F
305 Input acceptor
306 Memory
307 Processor
321 Antenna
322 Speaker
323 Microphone
324 LCD
325 Touch panel
351 Acquirer
352 Receiver
353 Determiner
354 Transmitter
355 Unit controller
356 Operating plan memory
357 History memory
358 Notifier
359 Calculator
360 Frequency memory
361 Updater
800 Operation history table
900 Frequency table

The invention claimed is:

1. A controller comprising:
an acquirer configured to acquire environmental parameters indicating an environment within a home;
a receiver configured to receive a request from a terminal device outside the home, the request including control content for remotely operating a unit installed in the home;
a transmitter configured to, responsive to the receiver receiving the request from the terminal device:
when a content of the request received by the receiver is determined to not satisfy a predetermined condition, transmit to the terminal device query data containing the environmental parameters acquired by the acquirer, and a query on whether to control the unit according to the control content included in the request, and
when the content of the request received by the receiver is determined to satisfy the predetermined condition, the transmitter does not transmit the query data to the terminal device; and
a unit controller configured to control the unit based on a response to the query from the terminal device.

2. The controller according to claim 1, wherein the acquirer is configured to acquire an operating status of the unit installed in the home as the environmental parameter.

3. The controller according to claim 1, wherein the acquirer is configured to acquire, from a camera, a captured image by the camera installed in the home as the environmental parameter.

4. The controller according to claim 1, wherein the acquirer is configured to acquire, from a sensor installed in the home, at least one of temperature, humidity, and brightness measured by the sensor as the environmental parameter.

5. The controller according to claim 1, further comprising an operating plan memory configured to store beforehand an operating plan of the unit,
wherein the transmitter is configured to transmit the query data to the terminal device if the receiver receives the request at the time when the operating plan is scheduled.

6. The controller according to claim 1, wherein the transmitter is configured to transmit the query data to the terminal device, if the request received by the receiver is a first request from the terminal device on a day.

7. The controller according to claim 1, wherein the transmitter is configured to transmit to the terminal device the query data containing information indicating an effect, when the unit controller makes the unit execute a process according to the request received by the receiver.

8. The controller according to claim 1, further comprising a notifier configured to notify that a specific event occurs in the unit with sound and/or an image, when notified by the unit of the occurrence of the specific event in the unit,
wherein the transmitter is configured to transmit to the terminal device a notification indicating that the specific event occurs in the unit.

9. The controller according to claim 8, wherein the specific event is at least one of following: a deactivation of some of or all of the functions of the unit; a breakdown of the unit; a remaining battery level of the unit having been equal to or lower than a predetermined level; and the unit having been continuously operating beyond a predetermined time.

10. The controller according to claim 1, further comprising:
a history memory configured to store a history of the requests received by the receiver; and
a calculator configured to calculate frequency of the request received by the receiver based on the history stored in the history memory,
wherein:
the determiner is configured to determine, based on the frequency calculated by the calculator, whether the request received by the receiver is a daily request or is an unusual request; and
the transmitter is configured to transmit to the terminal device the query data, when the determiner determines that the request received by the receiver is an unusual request.

11. The controller according to claim 10, further comprising:
a frequency memory configured to store the frequency calculated by the calculator for each kind of the request; and
an updater configured to update the frequency stored in the frequency memory after when the unit controller controls the unit based on the request received by the receiver.

12. The controller according to claim 1, wherein the transmitter is configured to transmit to the terminal device a notification indicating that the unit is not controlled based on the request, if the request is received by the receiver within a prohibiting time period which is set based on a direct operation to the unit by a user, and in which an instruction from the terminal device is prohibited.

13. The controller according to claim 1, wherein the transmitter is configured to transmit to the terminal device a notification indicating that the unit is not controlled based on the request from the terminal device, if a user sets a prohibiting time period in which the unit prohibits an instruction from the terminal device.

14. A unit control system including a unit and a controller installed within a home, and a terminal device that communicates with the controller, the terminal device comprising:
an acceptor configured to accept a request from a user, the request including control content for remotely controlling the unit; and
a transmitter configured to transmit the request accepted by the acceptor to the controller;

the controller comprising:
an acquirer configured to acquire environmental parameters indicating an environment within the home;
a receiver configured to receive the request from the terminal device;
a transmitter configured to, responsive to the receiver receiving the request from the terminal device:
when a content of the request received by the receiver is determined to not satisfy a predetermined condition, transmit to the terminal device query data containing the environmental parameters acquired by the acquirer, and a query on whether to control the unit according to the control content included in the request,
when the content of the request received by the receiver is determined to satisfy the predetermined condition, the transmitter of the controller does not transmit the query data to the terminal device; and
a unit controller configured to control the unit based on a response to the query from the terminal device, wherein:
the acceptor of the terminal device further configured to accept input from the user on whether to control the unit according to the control content included in the request, based on the query data transmitted from the controller; and
the transmitter of the terminal device is further configured to transmit to the controller the response including the input accepted by the acceptor of the terminal device.

15. A unit control method comprising:
acquiring environmental parameters indicating an environment within a home;
receiving a request from a terminal device outside the home, the request including control content for remotely operating a unit installed in the home;
responsive to receiving the request from the terminal device:
when a content of the received request is determined to not satisfy a predetermined condition, transmitting to the terminal device query data containing the environmental parameters acquired in the acquiring and a query on whether to control the unit according to the control content included in the request, and
when the content of the received request is determined to satisfy the predetermined condition, the query data is not transmitted to the terminal device; and
controlling the unit based on a response to the query from the terminal device.

16. A non-transitory computer-readable recording medium storing a program for causing a computer to function as:
an acquirer configured to acquire environmental parameters indicating an environment within a home;
a receiver configured to receive a request from a terminal device outside the home, the request including control content for remotely operating a unit installed in the home;
a transmitter configured to, responsive to the request from the terminal device being received by the receiver:
when a content of the request received by the receiver is determined to not satisfy a predetermined condition, transmit to the terminal device query data containing the environmental parameters acquired by the acquirer and a query of whether to control the unit according to the control content included in the request, and
when the content of the request received by the receiver is determined to satisfy the predetermined condition, the transmitter does not transmit the query data to the terminal device; and
a unit controller configured to control the unit based on a response to the query from the terminal device.

17. A controller comprising:
an acquirer configured to acquire environmental parameters indicating an environment within a home;
a receiver configured to receive a request from a terminal device outside the home for remotely operating a unit installed in the home;
a transmitter configured to transmit to the terminal device query data containing the environmental parameters acquired by the acquirer, and a query on whether to control the unit according to the request, when the receiver receives the request from the terminal device; and
a unit controller configured to control the unit based on a response to the query from the terminal device,
wherein the transmitter is configured to re-transmit the query data to the terminal device at predetermined time intervals until the response to the query is received when the receiver receives the request, and stop the re-transmitting of the query data when the response to the query is received.

18. A controller comprising:
an acquirer configured to acquire environmental parameters indicating an environment within a home;
a receiver configured to receive a request from a terminal device outside the home for remotely operating a unit installed in the home;
a transmitter configured to transmit to the terminal device query data containing the environmental parameters acquired by the acquirer, and a query on whether to control the unit according to the request, when the receiver receives the request from the terminal device;
a unit controller configured to control the unit based on a response to the query from the terminal device; and
a notifier configured to notify that the receiver has received the request with sound and/or an image.

19. A controller comprising:
an acquirer configured to acquire environmental parameters indicating an environment within a home;

a receiver configured to receive a request from a terminal device outside the home for remotely operating a unit installed in the home;

a transmitter configured to transmit to the terminal device query data containing the environmental parameters acquired by the acquirer, and a query on whether to control the unit according to the request, when the receiver receives the request from the terminal device;

a unit controller configured to control the unit based on a response to the query from the terminal device; and a determiner configured to determine whether to make the query to the terminal device, wherein the transmitter is configured to transmit the query data to the terminal device when the determiner determines to make the query to the terminal device.

* * * * *